United States Patent
Igarashi et al.

(10) Patent No.: US 12,556,285 B2
(45) Date of Patent: Feb. 17, 2026

(54) OPTICAL TRANSMITTER AND FREQUENCY CONTROL METHOD IN OPTICAL TRANSMISSION

(71) Applicant: NTT, Inc., Tokyo (JP)

(72) Inventors: Ryo Igarashi, Musashino (JP); Masamichi Fujiwara, Musashino (JP); Junichi Kani, Musashino (JP)

(73) Assignee: NTT, Inc., Tokyo (JP)

( * ) Notice: Subject to any disclaimer, the term of this patent is extended or adjusted under 35 U.S.C. 154(b) by 103 days.

(21) Appl. No.: 18/024,853

(22) PCT Filed: Sep. 9, 2020

(86) PCT No.: PCT/JP2020/034112
§ 371 (c)(1),
(2) Date: Mar. 6, 2023

(87) PCT Pub. No.: WO2022/054166
PCT Pub. Date: Mar. 17, 2022

(65) Prior Publication Data
US 2023/0318713 A1    Oct. 5, 2023

(51) Int. Cl.
*H04B 10/64*    (2013.01)
*H04B 10/50*    (2013.01)
(Continued)

(52) U.S. Cl.
CPC ......... *H04B 10/516* (2013.01); *H04B 10/503* (2013.01); *H04B 10/572* (2013.01); *H04B 10/64* (2013.01); *H04J 14/02* (2013.01)

(58) Field of Classification Search
None
See application file for complete search history.

(56) References Cited

U.S. PATENT DOCUMENTS

2003/0072060 A1*  4/2003  Sourani .................. H04B 10/60
                                                  398/121
2011/0182584 A1*  7/2011  Gottwald ............... H04B 10/63
                                                  398/79
(Continued)

FOREIGN PATENT DOCUMENTS

CN        105553555 B  *  2/2018

OTHER PUBLICATIONS

Junwen Zhang et al., "Rate-flexible Single-wavelength TFDM 100G Coherent PON based on Digital Subcarrier Multiplexing Technology", OFC2020, W1E.5, 2020.
(Continued)

*Primary Examiner* — Li Liu
(74) *Attorney, Agent, or Firm* — Harness, Dickey & Pierce, P.L.C.

(57) ABSTRACT

An optical transmission apparatus includes an optical transmitter that generates an optical signal in an uplink direction by modulating output light of a laser that outputs light of a first frequency with a subcarrier on which transmission data is superimposed, a heterodyne detection unit that receives an optical signal in a downlink direction by heterodyne detection, a control unit that calculates a first intermediate frequency based on the frequency of the downlink signal received by the heterodyne detection and the first frequency of the laser, and controls the first frequency of the laser when there is a difference between the calculated first intermediate frequency and a reference second intermediate frequency by a threshold or more.

6 Claims, 17 Drawing Sheets

(51) Int. Cl.
*H04B 10/516* (2013.01)
*H04B 10/572* (2013.01)
*H04J 14/02* (2006.01)

(56) References Cited

U.S. PATENT DOCUMENTS

2015/0086204 A1* 3/2015 Kaneda .................. H04B 10/64
 398/76
2021/0336777 A1* 10/2021 Brunner ................ H04L 9/0858

OTHER PUBLICATIONS

Takashi Mizuochi et al., "622Mbit/s-16ch FDM Coherent Lightwave Transmission Equipment", The Institute of Image Information and Television Engineers, 1993, vol. 17, No. 18, pp. 25-30.
K. Takano et al., "SPM effect on carrier-suppressed optical SSB transmission with NRZ and RZ formats", IET Electron. Lett., vol. 40, No. 18, pp. 1150-1151, 2004.
Kazushige Yonenaga et al., "Dispersion Compensation for Homodyne Detection Systems Using a 10-Gb/s Optical PSK-VSB Signal", IEEE Photon. Technol. Lett., vol. 7, No. 8, pp. 929-931, 1995.

* cited by examiner

OPTICAL TRANSMITTER AND FREQUENCY CONTROL METHOD IN OPTICAL TRANSMISSION

CROSS-REFERENCE TO RELATED APPLICATIONS

This application is a 371 U.S. National Phase of International Application No. PCT/JP2020/034112, filed on Sep. 9, 2020. The entire disclosure of the above application is incorporated herein by reference.

TECHNICAL FIELD

The present invention relates to an optical transmitter and a frequency control method in an optical transmission.

BACKGROUND ART

In the conventional optical subcarrier multiplex signal transmission, a carrier wave suppression type optical subcarrier multiplex signal using an optical IQ modulator as an optical transmitter is utilized. In this case, the optical receiver demodulates the optical subcarrier multiplex signal by using optical intradyne detection. Thus, the influence of the deterioration of signal performance due to interference noise is reduced at the time of optical intradyne detection.

FIG. 13 is a diagram showing a configuration of an optical transmission system 1000 according to the conventional technology. FIG. 13 shows a case where the optical transmission system 1000 is applied to a PON (Passive Optical Network) system. In the optical transmission system 1000, N units of ONU (Optical Network Unit) 100-1 to 100-N (N is an integer of 1 or more) and 1 unit of OLT (Optical Line Terminal) 110 are provided. The ONU 100-1 to 100-N and the OLT 110 are connected by an optical fiber via an optical splitter 120.

The optical splitter 120 multiplexes the optical signals outputted from each of the ONU 100-1 to 100-N and outputs the multiplexed optical signals to the OLT 110. The optical splitter 120 demultiplexes the optical signal outputted from the OLT 110 and outputs the demultiplexed optical signal to the ONU 100-1 to 100-N.

The ONU 100 is installed, for example, in a house of a subscriber who receives provision of a communication service. The ONU 100 includes an optical transmitter and an optical receiver.

The OLT 110 is, for example, installed in the accommodation station. The OLT 110 includes the optical transmitter and the optical receiver. The optical receiver receives, for example, the subcarrier multiplex signal multiplexed by the optical splitter 120.

An optical transmitter included in each ONU 100-1 to 100-N generates a modulation signal by optically modulating a laser output of the same frequency ($f_0$) with a subcarrier of an electric stage on which transmission data is superimposed. The modulation signals generated by each ONU 100 are merged by the optical splitter 120, subjected to optical subcarrier multiplex, and transmitted to the OLT 110.

FIG. 13 shows a case where each of the ONU 100-1 to 100-N generates the optical subcarrier at the position of $f_0 \pm \Delta f$, $f_0 \pm 2\Delta f$, ..., $f_0 \pm N\Delta f$. For example, the ONU 100-1 generates the optical subcarrier at the position of $f_0 \pm \Delta f$, the ONU 100-2 generates the optical subcarrier at the position of $f_0 \pm 2\Delta f$, and the ONU 100-N generates the optical subcarrier at the position of $f_0 \pm N\Delta f$. That is, although one ONU 100 generates one optical subcarrier, one ONU 100 may generate a plurality of optical subcarriers.

When each of the ONUs 100-1 to ONU 100-N transmits a modulation signal of an optical subcarrier shown in FIG. 13, a carrier wave of a subcarrier multiplex signal received by the OLT 110 is superimposed at the same frequency ($f_0$). The conventional optical transmitter will be described with reference to FIGS. 14 to 16.

FIG. 14 is a block diagram showing the functional configuration of a conventional optical transmitter 150 with an analog system. The optical transmitter 150 includes a symbol mapper 151, an oscillator 152, a modulation circuit 153, a laser 154, and a light intensity modulator 155.

The symbol mapper 151 maps a data signal inputted from the outside according to a modulation system. The oscillator 152 outputs a sine wave (subcarrier) having a frequency $k\Delta f$ ($k=1, 2, \ldots, N$).

The modulation circuit 153 modulates the subcarrier outputted from the oscillator 152 with the data mapped by the symbol mapper 151. The laser 154 outputs the optical signal having a frequency $f_0$ to the light intensity modulator 155.

The light intensity modulator 155 optically modulates the output light of the laser 154 with the subcarrier modulated by the modulation circuit 153. Specifically, the light intensity modulator 155 optically modulates the intensity of the output light of the laser 154 with the subcarrier modulated by the modulation circuit 153 to generate a modulation signal.

FIG. 15 is a block diagram showing a functional configuration of an optical transmitter 150a with a conventional digital system. The optical transmitter 150a includes symbol mappers 151-1 to 151-$n$, a laser 154, a serial-parallel conversion unit 156, a Hermitian symmetrization unit 157, frequency shift units 158-1 to 158-2$n$, an adder 159, a D/A converter 160, and a light intensity modulator 161. The number of the frequency shift units 158-1 to 158-2$n$ is twice the number of the symbol mapper 151.

The serial-parallel conversion unit 156 parallelizes data signals inputted from the outside into 2N columns. For example, the serial-parallel conversion unit 156 parallelizes the data signals by the number of symbol mappers 151-1 to 151-$n$. The symbol mappers 151-1 to 151-$n$ perform the mapping of the parallelized data signals corresponding to the modulation system. The mapped data signal is inputted to the Hermitian symmetrization unit 157.

The Hermitian symmetrization unit 157 arranges the data on a subcarrier so that the inputted mapped data signal becomes complex conjugate with a zero frequency as a center. Thus, the Hermitian symmetrization unit 157 can generate a real number component and an imaginary number component of the parallelized data signal. The frequency shift units 158-1 to 158-2$n$ move the parallelized data outputted from the Hermitian symmetrization unit 157 so as not to overlap on the frequency axis. The frequency shift units 158-1 to 158-$n$ move the parallelized data of the upper side band components so as not to overlap on the frequency axis. The frequency shift units 158-$n$+1 to 2$n$ move the parallelized data of the lower side band components so as not to overlap on the frequency axis.

The adder 159 generates a frequency subcarrier multiplex signal by adding data signals outputted from each of the frequency shift units 158-1 to 158-2$n$. The D/A converter 160 perform digital-to-analog conversion of the frequency subcarrier multiplex signal. Thus, the D/A converter 160 generates an I subcarrier multiplex signal in the electric stage.

The light intensity modulator 161 optically modulates the output light of the laser 154 with the I subcarrier multiplex signal to generate the modulation signal. The modulation signals generated by each ONU 100 are merged by the optical splitter 120, subjected to optical subcarrier multiplex, and transmitted to the OLT 110.

FIG. 16 is a block diagram showing a functional configuration of an optical transmitter 150b for generating a carrier wave suppression type optical subcarrier multiplex signal. In the optical transmitter 150b includes the symbol mappers 151-1 to 151-n (n is two or more), the laser 154, the serial-parallel conversion unit 156, the frequency shift units 158-1 to 158-n, the adder 159, the D/A (Digital-to-Analog) converters 160-1 to 160-2, and the optical IQ modulator 162.

The serial-parallel conversion unit 156 parallelizes data signals inputted from the outside into 2N columns. For example, the serial-parallel conversion unit 156 parallelizes the data signals by the number of symbol mappers 151-1 to 151-n.

The symbol mappers 151-1 to 151-n perform the mapping of the parallelized data signals corresponding to the modulation system. The mapped data signal is inputted to the frequency shift units 158-1 to 158-n. The frequency shift units 158-1 to 158-n move the inputted data signals so as not to overlap on the frequency axis.

The adder 159 generates a frequency multiplex signal by adding the data signals outputted from each of the frequency shift units 158-1 to 158-n. The D/A converters 160-1 to 160-2 perform digital-to-analog conversion of the frequency multiplex signal. For example, the D/A converter 160-1 performs the digital-to-analog conversion of a real part (I component) of the frequency multiplex signal. For example, the D/A converter 160-2 performs the digital-to-analog conversion of an imaginary part (Q component) of the frequency multiplex signal. Thus, a subcarrier multiplex signal divided into I and Q components is generated in the electric stage.

The laser 154 outputs the optical signal having the frequency $f_0$ to the optical IQ modulator 162. The optical IQ modulator 162 generates the modulation signal by optically modulating the output light of the laser 154 with a subcarrier multiplex signal divided into the I component and the Q component. The optical IQ modulator 162 transmits the generated modulation signals via an optical fiber to an optical receiver.

For example, as shown in FIG. 14, the parallel data of 2N columns is superimposed on an optical subcarrier at a frequency position numbered by #1, . . . , #N−1, #N, #N+1, #N+2, . . . , #2N. However, the optical transmitter 150 does not use all optical subcarriers as shown in FIG. 16(A). The serial-parallel conversion is performed in accordance with the optical subcarrier to be used. For example, FIG. 16(B) denotes an example in which only the optical subcarrier #N−1 is used. Although the DSB (Double Side Band) modulation utilizing both the upper and lower side bands is illustrated in FIG. 16, the SSB (Single Side Band) modulation can also be dealt with by utilizing only the optical subcarrier of the upper side band or the lower side band.

FIG. 17 is a block diagram showing the functional configuration of the conventional optical receiver 200. The optical receiver 200 has a configuration of a digital coherent receiver by general optical intradyne detection. The optical receiver 200 includes a PBS (Polarization Beam Splitter) 201, a local oscillation light source 202, the PBS 203, an optical 90-degree hybrid detector 204-1 to 204-2, A/D (Analog-to-Digital) converters 205-1 to 205-2, A/D converters 206-1 to 206-2, and a digital signal processing unit 207.

The PBS 201 is a polarization splitter. The PBS 201 inputs the modulation signals transmitted from the optical transmitter. The PBS 201 separates the inputted modulation signal into an optical signal of horizontal polarization and an optical signal of vertical polarization. The PBS 201 outputs the optical signal of the horizontal polarization to the optical 90-degree hybrid detector 204-1 and the optical signal of the vertical polarization to the optical 90-degree hybrid detector 204-2.

The local oscillation light source 202 outputs local light. The PBS 203 is a polarization splitter. The PBS 203 inputs the local light outputted from the local oscillation light source 202. The PBS 203 separates the inputted local light into an optical signal of the horizontal polarization and an optical signal of the vertical polarization. The PBS 203 outputs the optical signal of the horizontal polarization to the optical 90-degree hybrid detector 204-1 and the optical signal of the vertical polarization to the optical 90-degree hybrid detector 204-2.

The optical 90-degree hybrid detector 204-1 inputs and processes the optical signal of the horizontal polarization. The optical 90-degree hybrid detector 204-1 includes the splitters 208-1 to 208-2, a $\pi/2$ delay unit 209, couplers 210-1 to 210-2, and balanced receivers 211-1 to 211-2.

The splitter 208-1 input the optical signal of the horizontal polarization outputted from the PBS 201. The splitter 208-1 branches the inputted optical signal of the horizontal polarization and outputs the branched signal to the couplers 210-1 and 210-2. The splitter 208-2 input the optical signal of the horizontal polarization outputted from the PBS 203. The splitter 208-2 branches the inputted optical signal of the horizontal polarization and outputs the branched signal to the couplers 210-1 and the $\pi/2$ delay unit 209.

The $\pi/2$ delay unit 209 delays the optical signal of the horizontal polarization outputted from the splitter 208-2 by $\pi/2$ and outputs the delayed signal to the coupler 210-2. The coupler 210-1 multiplexes and interferes the optical signal of the horizontal polarization outputted from the splitter 208-1 and the optical signal of the horizontal polarization outputted from the splitter 208-2, thereby generating interference light. The coupler 210-1 branches the generated interference light into two interference lights and outputs the two interference lights to the balanced receiver 211-1.

The coupler 210-2 multiplexes and interferes the optical signal of the horizontal polarization outputted from the splitter 208-1 and the $\pi/2$ delayed optical signal of the horizontal polarization outputted from the $\pi/2$ delay unit 209, thereby generating interference light. The coupler 210-2 branches the generated interference light into two interference lights and outputs the two interference lights to the balanced receiver 211-2.

The balanced receiver 211-1 converts the two interference lights outputted from the coupler 210-1 into electric signals. The balanced receiver 211-1 detects the difference between the converted electric signals as an in-phase component, that is, an I component, and outputs the difference to the A/D converter 205-1.

The balanced receiver 211-2 converts the two interference lights outputted from the coupler 210-2 into electric signals. The balanced receiver 211-2 detects the difference between the converted electric signals as an orthogonal component, that is, a Q component, and outputs the difference to the A/D converter 205-2.

The A/D converter 205-1 samples the analog electric signal of the I component and outputs the sampled signal to the digital signal processing unit 207 as a digital sampling signal. The A/D converter 205-2 samples the analog electric signal of the Q component and outputs the sampled signal to the digital signal processing unit 207 as a digital sampling signal.

The optical 90-degree hybrid detector 204-2 inputs and processes the optical signal of the vertical polarization. The optical 90-degree hybrid detector 204-2 has the splitters 212-1 to 212-2, the π/2 delay unit 213, the couplers 214-1 to 214-2, and the balanced receiver 215-1 to 215-2.

The splitter 212-1 inputs the optical signal of the vertical polarization outputted from the PBS 201. The splitter 212-1 branches the inputted optical signal of the vertical polarization and outputs the branched optical signal to the couplers 214-1 and 214-2. The splitter 212-2 inputs the optical signal of the vertical polarization outputted from the PBS 203. The splitter 212-2 branches the inputted optical signal of the vertical polarization and outputs the branched optical signal to the coupler 214-1 and the π/2 delay unit 213.

The π/2 delay unit 213 delays the optical signal of the vertical polarization outputted from the splitter 212-2 by π/2 and outputs the delayed signal to the coupler 214-2. The coupler 214-1 multiplexes and interferes the optical signal of the vertical polarization outputted by the splitter 212-1 and the optical signal of the vertical polarization outputted by the splitter 212-2, thereby generating interference light. The coupler 214-1 branches the generated interference light into two interference lights and outputs the two interference lights to the balanced receiver 215-1.

The coupler 214-2 multiplexes and interferes the optical signal of the vertical polarization outputted by the splitter 212-1 and the π/2 delayed optical signal of the vertical polarization outputted by the π/2 delay unit 213, thereby generating interference light. The coupler 214-2 branches the generated interference light into two interference lights and outputs the two interference lights to the balanced receiver 215-2.

The balanced receiver 215-1 converts the two interference lights outputted from the coupler 214-1 into electric signals. The balanced receiver 215-1 detects the difference between the converted electric signals as an in-phase component, that is, an I component, and outputs the difference to the A/D converter 206-1.

The balanced receiver 215-2 converts the two interference lights outputted from the coupler 214-2 into electric signals. The balanced receiver 215-2 detects the difference between the converted electric signals as an orthogonal component, that is, a Q component, and outputs the difference to the A/D converter 206-2.

The A/D converter 206-1 samples the analog electric signal of the I component and outputs the sampled signal to the digital signal processing unit 207 as a digital sampling signal. The A/D converter 206-2 samples the analog electric signal of the Q component and outputs the sampled signal to the digital signal processing unit 207 as a digital sampling signal.

The digital signal processing unit 207 receives the digital sampling signals outputted from the A/D converters 205-1 to 205-4, respectively. The digital signal processing unit 207 demodulates the inputted sampling signal.

The processing performed by the optical receiver 200 is the same as that of a general intradyne receiver used in digital coherent transmission.

As described above, conventionally, in the transmission of the optical subcarrier multiplex signal, the optical transmitter 150b shown in FIG. 16 performs optical subcarrier modulation using the optical IQ modulator 162 to suppress the carrier wave, so that the influence of interference noise during optical reception can be reduced (refer to NPL 1).

CITATION LIST

Non Patent Literature

[NPL 1 "Rate-flexible Single-wavelength TDFM 100G Coherent PON based on Digital Subcarrier Multiplexing Technology", OFC2020, W1E.5, 2020.

SUMMARY OF INVENTION

Technical Problem

In the uplink transmission of the system shown in FIG. 13, in the case of using the optical transmitter of FIGS. 14 to 16, for example, if uplink signal wavelengths outputted by the optical transmitter arranged in each ONU 100 are deviated from each other, the optical subcarriers transmitted from each ONU 100 overlap on the frequency axis when the optical subcarriers are multiplexed by the optical splitter 120. There is a problem that when an optical signal is received, each subcarrier is separated by frequency filtering by digital signal processing but when the optical subcarriers are overlapped on the frequency axis, the optical subcarriers cannot be received. Further, the optical intradyne detector has a complicated configuration and is expensive for use in an access system.

In view of the aforementioned circumstances, an object of the present invention is to provide a technique that can suppress the overlap of the subcarriers of the multiplex signal on the frequency axis with low cost.

Solution to Problem

An optical transmission apparatus according to one embodiment of the present invention includes an optical transmitter that generates an optical signal in an uplink direction by modulating output light of a laser that outputs light of a first frequency with a subcarrier on which transmission data is superimposed, a heterodyne detection unit that receives an optical signal in a downlink direction by heterodyne detection, a control unit that calculates a first intermediate frequency based on the frequency of the downlink signal received by the heterodyne detection and the first frequency of the laser, and controls the first frequency of the laser when there is a difference between the calculated first intermediate frequency and a reference second intermediate frequency by a threshold or more.

A frequency control method according to one embodiment of the present invention includes generating an optical signal in an uplink direction by modulating output light of a laser that outputs the light of a first frequency with a subcarrier on which transmission data is superimposed, receiving an optical signal in a downlink direction by heterodyne detection, and calculating a first intermediate frequency based on the frequency of the downlink signal received by the heterodyne detection and the first frequency of the laser and controlling the first frequency of the laser when there is a difference between the calculated first intermediate frequency and a reference second intermediate frequency by a threshold or more.

Advantageous Effects of Invention

According to the present invention, it is possible to suppress overlapping on the frequency axis of the optical subcarrier of the multiplex signal at low cost.

DESCRIPTION OF EMBODIMENTS

The following describes an embodiment of the present invention with reference to the drawings.

First, the outline of the present invention will be described. In the optical transmission system provided with an ONU (a subscriber line terminating device) and an OLT (a subscriber line end station device), heterodyne detection is performed in the ONU. Then, each ONU calculates an intermediate frequency $f_{IF}=|f_1-f_0|$ (a first intermediate frequency) on the basis of a frequency $f_1$ of a downlink signal transmitted from the OLT and the frequency $f_0$ of the uplink light source in the ONU. Each ONU compares an acquired value with a held intermediate frequency $f'_{IF}=|f'_1-f'_0|$ (a second intermediate frequency) in advance which is calculated on the basis of the frequency $f'_0$ of each ONU uplink light source and the frequency $f'_1$ of the downlink signal. As a result of the comparison, if a deviation occurs between the intermediate frequency $f_{IF}$ and the intermediate frequency $f'_{IF}$, the ONU in which the deviation occurs controls the frequency $f_0$ of the uplink light source (for example, a laser), so that the intermediate frequency $f_{IF}$ and the intermediate frequency $f'_{IF}$ become the same value. For example, the ONU controls the frequency $f_0$ of the uplink light source (for example, a laser) to be the frequency of the uplink signal held in advance.

Hereinafter, a specific configuration will be described.

First Embodiment

Figure 1:
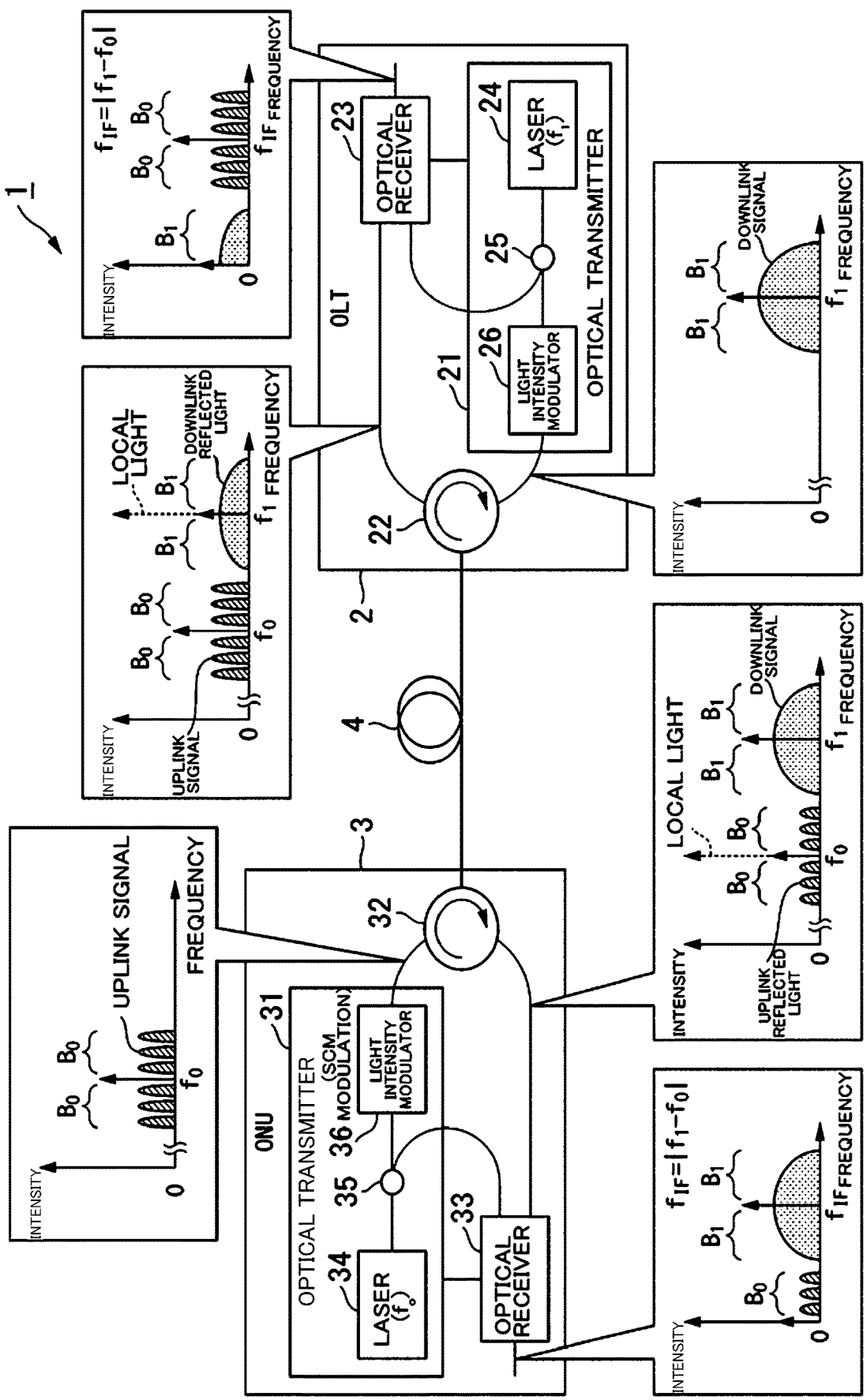
FIG. 1 is a diagram showing a configuration of an optical transmission system according to a first embodiment.

FIG. 1 is the diagram showing the configuration of the optical transmission system 1 according to the first embodiment. FIG. 1 shows a case where the optical transmission system 1 is applied to a PON system. The optical transmission system 1 includes an OLT 2 and an ONU 3. The OLT 2 and ONU 3 are connected to each other via an optical fiber 4. Although the number of ONUs 3 is one in FIG. 1, a plurality of ONUs 3 may be provided in the optical transmission system 1. In the following description, a transmission direction of a signal from the OLT 2 to the ONU 3 is defined as a downlink direction, and a transmission direction of a signal from the ONU 3 to the OLT 2 is defined as an uplink direction.

The OLT 2 is installed, for example, in an accommodation station. The OLT 2 includes an optical transmitter 21, an optical circulator 22, and an optical receiver 23.

The optical transmitter 21 generates the optical signal of the downlink direction (it is called a "downlink signal" below) and transmits the generated downlink signal to the ONU 3. In FIG. 1, an example will be described in which an ASK (Amplitude-Shift Keying) signal (on/off signal) of a single carrier is generated by using a light intensity modulator as a down signal. The optical transmitter 21 may use a modulation signal generated by using BPSK (Binary Phase Shift Keying) or QPSK (Quadrature Phase Shift Keying) using an optical phase modulator or an optical IQ modulator. In the case of performing single carrier modulation, the downlink signal to be transmitted to each ONU 3 may be time division multiplexed (TDM: Time Division Multiple) different from the uplink signal. The optical transmitter 21 may perform SCM (Subcarrier Multiplexing) modulation and allocate a signal to be transmitted to each ONU 3 to an optical subcarrier.

The optical transmitter 21 includes a laser 24, an optical branching unit 25, and a light intensity modulator 26.

The laser 24 outputs the optical signal having a frequency $f_1$ to the light intensity modulator 26.

The optical branching unit 25 branches a part of the optical signal outputted from the laser 24 to the optical receiver 23. That is, the optical signal outputted from the laser 24 is outputted to the optical receiver 23 and the light intensity modulator 26 via the optical branching unit 25.

The light intensity modulator 26 generates the downlink signal by performing the intensity modulation of the output light of the laser 24.

The optical circulator 22 has three ports. A first port of the optical circulator 22 is connected to the optical transmitter 21. A second port of the optical circulator 22 is connected to the optical fiber 4. A third port of the optical circulator 22 is connected to the optical receiver 23. The downlink signal inputted to the first port of the optical circulator 22 is outputted from the second port of the optical circulator 22. The uplink signal inputted to the second port of the optical circulator 22 is outputted from the third port of the optical circulator 22.

The optical receiver 23 receives the optical signal transmitted from the ONU 3 by the heterodyne detection. The optical receiver 23 receives, for example, an optical subcarrier multiplex (SCM) signal transmitted from the ONU 3 by the heterodyne detection. In this case, the optical receiver 23 utilizes the optical signal of the laser 24 branched by the optical branching unit 25 as a local light. The optical receiver 23 demodulates the received optical subcarrier multiplex by digital signal processing.

The ONU 3 is installed in a house of a subscriber who receives provision of a communication service, for example. The ONU 3 includes an optical transmitter 31, an optical circulator 32, and an optical receiver 33.

Figure 14:
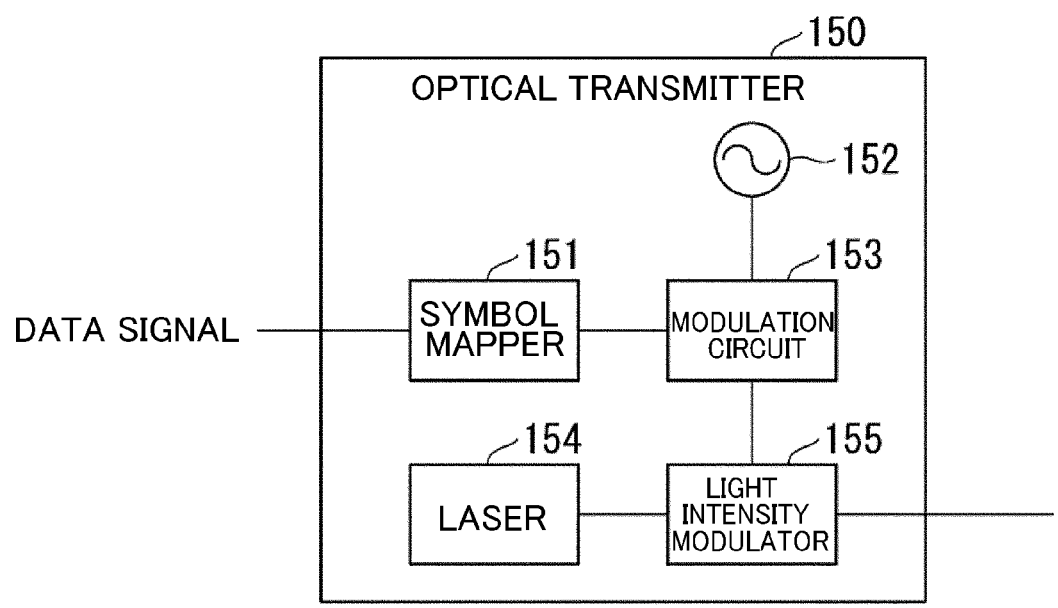
FIG. 14 is a block diagram showing a functional configuration of an optical transmitter with an analog system.
Figure 15:
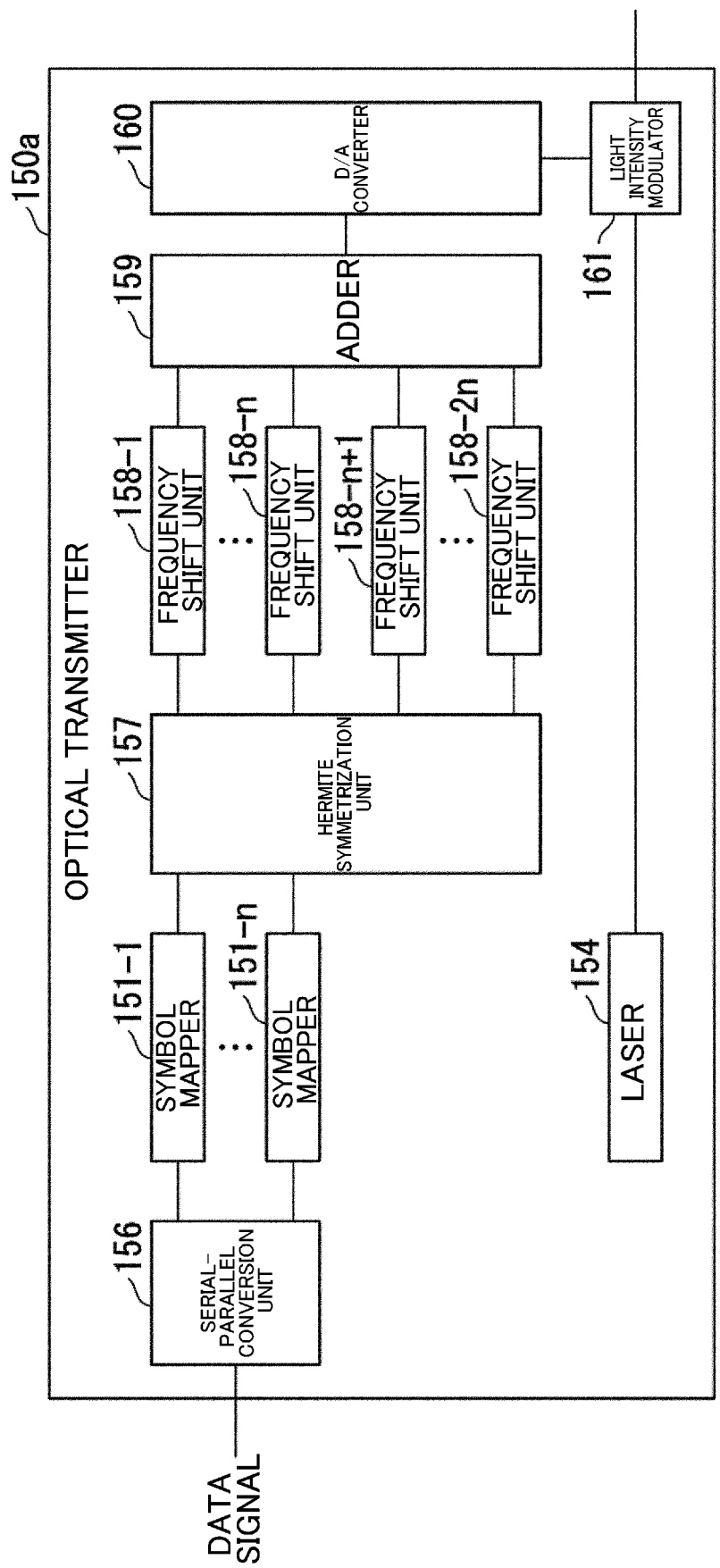
FIG. 15 is a block diagram showing a functional configuration of an optical transmitter with a digital system.
Figure 16:
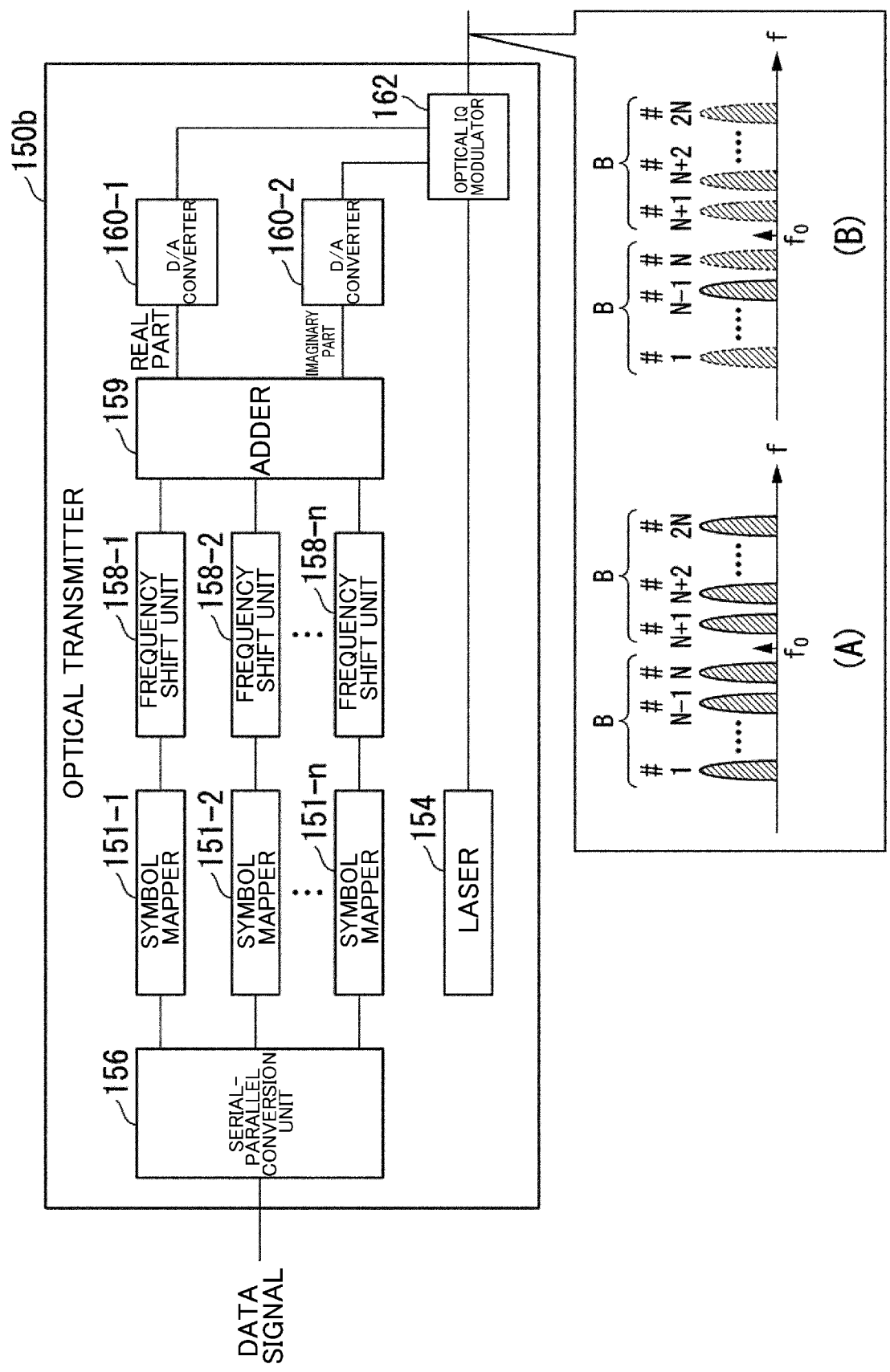
FIG. 16 is a block diagram showing a functional configuration of an optical transmitter for generating a carrier wave suppression type optical subcarrier multiplex signal.
Figure 17:
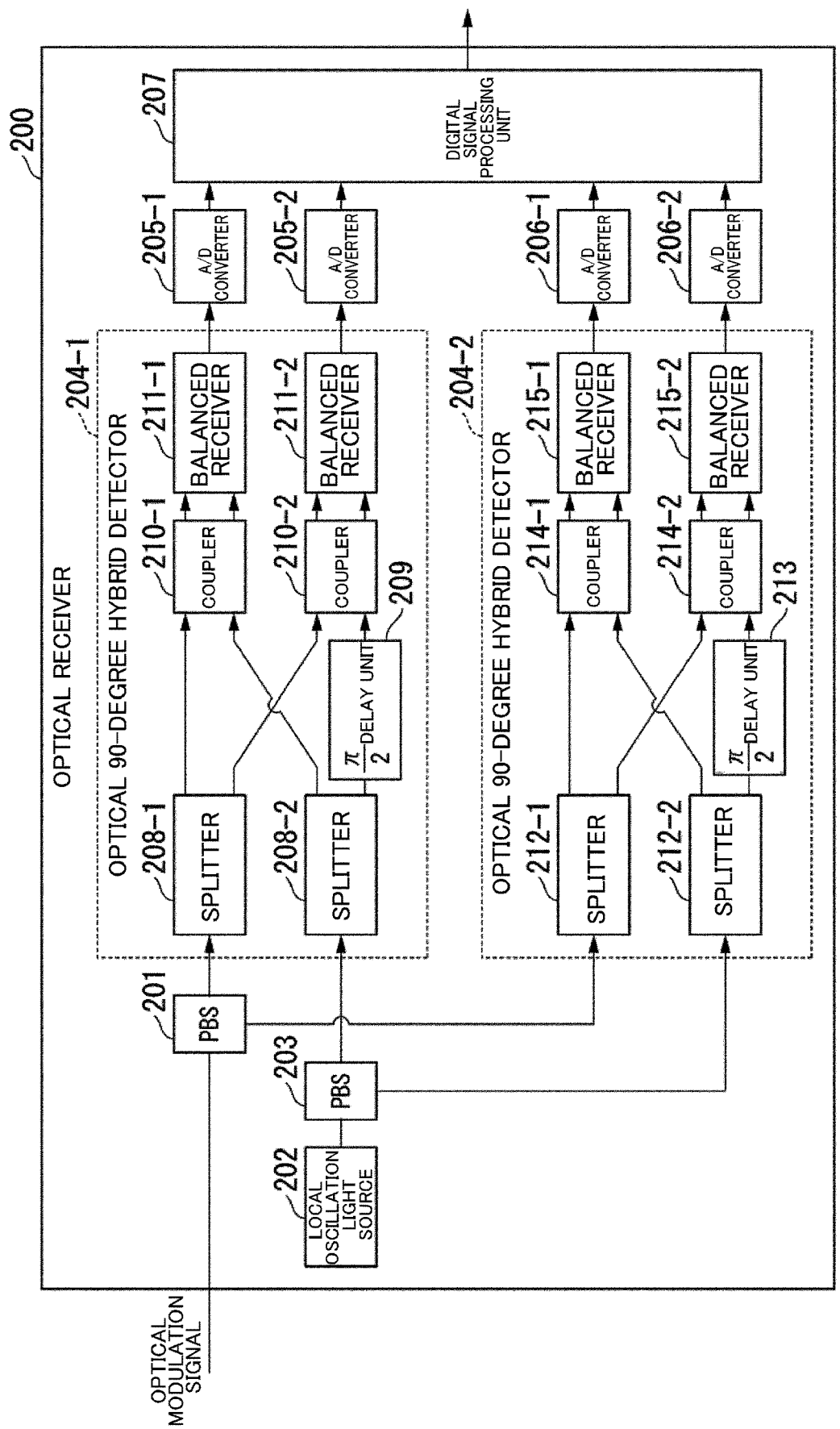
FIG. 17 is a diagram showing a configuration of a conventional optical receiver.

The optical transmitter 31 generate an optical signal of the uplink direction 8 it is called a "uplink signal" below) and transmits the generated uplink signal to the OLT 2. As the optical transmitter 31 provided in the ONU 3, any one of the optical transmitters 150, 150a, 150b shown in FIGS. 14 to 16 is used. In FIG. 1, a case where a light intensity modulator is used as the optical transmitter 31 will be described as an example. In this case, the optical transmitter 31 generates the uplink signal optically modulated by the subcarrier.

The subcarrier is generated in a range of $\pm B_0$ with respect to the frequency $f_0$ of the carrier wave. The $B_0$ is a bandwidth of one side band of an uplink signal subjected to both side bands (DSB: Double Side Band) modulation. As shown in the illustration of FIG. 1, when an optical signal is incident on the optical fiber 4, reflection is generated by Rayleigh scattering. In order to avoid this influence, it is desirable that the intermediate frequency $f_{IF}$ ($=|f_1-f_0|$) is made equal to $B_0+B_1$. Here, $B_1$ represents the bandwidth of one side band of the downlink signal.

The optical transmitter 31 includes a laser 34, an optical branching unit (brancher) 35, and a light intensity modulator 36.

The laser 34 outputs the optical signal having a frequency f0 to the light intensity modulator 26. Here, the frequency of the laser 34 is different from the frequency of the laser 24 included in the OLT 2 ($f_0 \neq f_1$).

The optical branching unit 35 branches a part of the optical signal outputted from the laser 34 to the optical receiver 33. That is, the optical signal outputted from the laser 34 is outputted to the optical receiver 33 and the light intensity modulator 36 via the optical branching unit 35.

The light intensity modulator 36 generates the uplink signal by performing the intensity modulation of the output light of the laser 34.

The optical circulator 32 has three ports. A first port of the optical circulator 32 is connected to the optical transmitter 31. A second port of the optical circulator 32 is connected to the optical fiber 4. A third port of the optical circulator 32 is connected to the optical receiver 33. The uplink signal inputted to the first port of the optical circulator 32 is outputted from the second port of the optical circulator 32. The downlink signal inputted to the second port of the optical circulator 32 is outputted from the third port of the optical circulator 32.

The optical receiver 33 receives the optical signal transmitted from the OLT 2 by the heterodyne detection. The optical receiver 33 receives the ask signal transmitted from the OLT 2, for example, by the heterodyne detection. In this case, the optical receiver 33 utilizes the optical signal of the laser 34 branched by the optical branching unit 35 as a local light.

Further, the optical receiver 33 calculates the intermediate frequency $f_{IF}=|f_1-f_0|$ on the basis of the frequency $f_1$ of the downlink signal transmitted from the OLT 2 and the frequency $f_0$ of the uplink light source in the ONU 3. The optical receiver 33 compares the calculated intermediate frequency $f_{IF}=|f_1-f_0|$ with the held intermediate frequency $f'_{IF}=|f'_1-f'_0|$ in advance which is calculated on the basis of the frequency $f'_0$ of the uplink light source and the frequency $f'_1$ of the downlink signal, when the deviation occurs, and controls the frequency $f_0$ of the uplink light source (for example, the laser) so that the intermediate frequency $f_{IF}$ and the intermediate frequency $f'_{IF}$ become the same value. Specifically, the ONU controls the frequency $f_0$ of the laser 34 so as to eliminate the deviation by adjusting the frequency $f_0$ of the uplink light source (for example, the laser) by the amount of the deviation.

It is assumed that the value of the intermediate frequency $f'_{IF}$ to be set by the optical receiver 33 is stored in a memory (not shown) or the like. For example, the value of the intermediate frequency $f'_{IF}$ to be set is notified to each ONU 3 by the OLT 2 before the start of processing.

Figure 2:
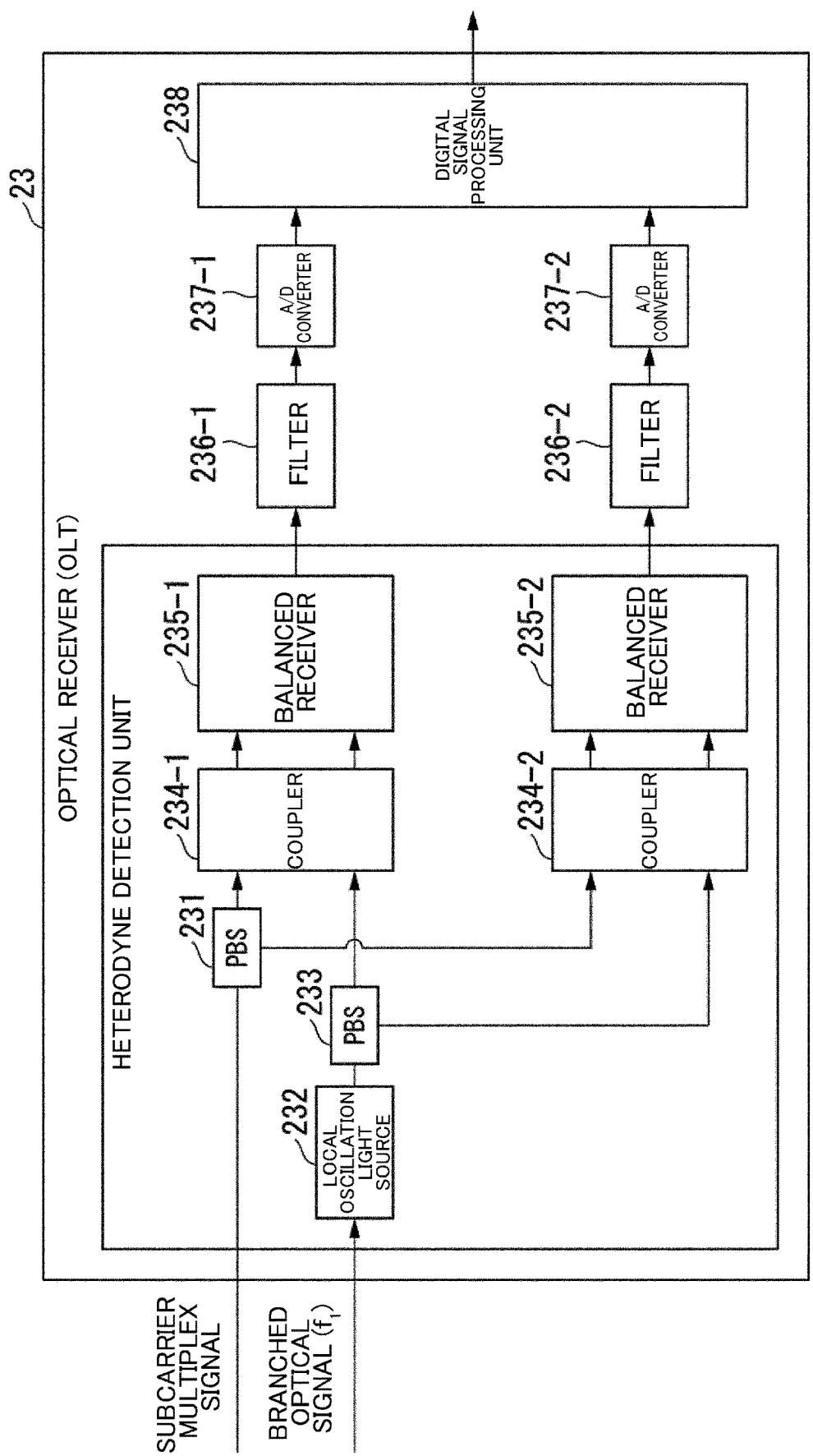
FIG. 2 is a block diagram showing a functional configuration of an optical receiver included in an OLT according to the first embodiment.

FIG. 2 is the block diagram showing the functional configuration of the optical receiver 23 provided in the OLT 2 according to the first embodiment. The optical receiver 23 is a digital coherent receiver for performing the optical heterodyne detection. The optical receiver 23 includes a PBS 231, a local oscillation light source 232, a PBS 233, couplers 234-1 and 234-2, balanced receivers 235-1 and 235-2, filters 236-1 and 236-2, A/D converters 237-1 and 237-2, and a digital signal processing unit 238. The PBS 231, the local oscillation light source 232, the PBS 233, the couplers 234-1 and 234-2, and balanced receivers 235-1 and 235-2 are examples constituting the first heterodyne detection unit.

The PBS 231 is a polarization splitter. The PBS 231 inputs the optical signal (for example, the subcarrier multiplex signal). Here, it is assumed that a subcarrier multiplex signal in which uplink signals transmitted from each of the plurality of ONUs 3 are multiplexed is inputted. The PBS 231 separates the inputted subcarrier multiplex signal into the subcarrier multiplex signal of the horizontal polarization and the subcarrier multiplex signal of the vertical polarization. The PBS 231 outputs the subcarrier multiplex signal of the horizontal polarization to the coupler 234-1, and outputs the subcarrier multiplex signal of the vertical polarization to the coupler 234-2.

The local oscillation light source 232 outputs the local light used for the optical heterodyne detection. For example, the local oscillation light source 232 outputs the optical signal of the laser 24, which is branched and inputted by the optical branching unit 25, as the local light.

The PBS 233 is a polarization splitter. The PBS 233 inputs the local light outputted from the local oscillation light source 232. The PBS 233 separates the inputted local light into the optical signal of the horizontal polarization and the optical signal of the vertical polarization. The PBS 233 outputs the optical signal of the horizontal polarization to the coupler 234-1, and outputs the optical signal of the vertical polarization to the coupler 234-2.

The coupler 234-1 multiplexes and interferes the subcarrier multiplex signal of the horizontal polarization outputted by the PBS 231 and the optical signal of the horizontal polarization outputted by the PBS 233 to generate the interference light. The coupler 234-1 branches the generated interference light into two interference lights and outputs the two interference lights to the balanced receiver 235-1.

The coupler 234-2 multiplexes and interfere the subcarrier multiplex signal of the vertical polarization outputted by the PBS 231 and the optical signal of the vertical polarization outputted by the PBS 233 to generate the interference light. The coupler 234-2 branches the generated interference light into two interference lights and outputs the two interference lights to the balanced receiver 235-2.

The balanced receiver 235-1 converts the two interference lights outputted from the coupler 234-1 into electric signals.

The balanced receiver 235-1 outputs the difference between the converted electric signals to the filter 236-1.

The balanced receiver 235-2 converts the two interference lights outputted from the coupler 234-2 into electric signals.

The balanced receiver 235-2 outputs the difference between the converted electric signals to the filter 236-2.

The filter 236-1 filters the electric signal representing the difference between the two interference lights outputted from the balanced receiver 235-1. The filter 236-1 is an LPF (Low-Pass Filter) or an HPF (High-Pass Filter). The LPF and HPF may be the analog circuit as shown in the figure, but may be performed by the digital signal processing.

For example, the filter 236-1 is LPF and extracts only the upper side band component (+) of the subcarrier multiplex (SCM) signal or is HPF and extracts only the lower side band component (−). It is more economical that the extraction of the upper side band component can receive the signal by utilizing the A/D converter of the lower frequency.

The filter 236-2 filters the electric signal representing the difference between the two interference lights outputted from the balanced receiver 235-2. The filter 236-2 is the LPF or the HPF.

The A/D converter 237-1 performs the analog-to-digital conversion of the upper side band component (+) or the lower side band component (−) extracted by the filter 236-1 to generates the digital signal.

The A/D converter 237-2 performs the analog-to-digital conversion of the upper side band component (+) or the lower side band component (−) extracted by the filter 236-2 to generates the digital signal.

The digital signal processing unit 238 inputs the digital signals outputted from each of A/D converter 237-1 and 237-2. The digital signal processing unit 238 demodulates the input digital signal by performing digital signal processing for each subcarrier.

Figure 3:
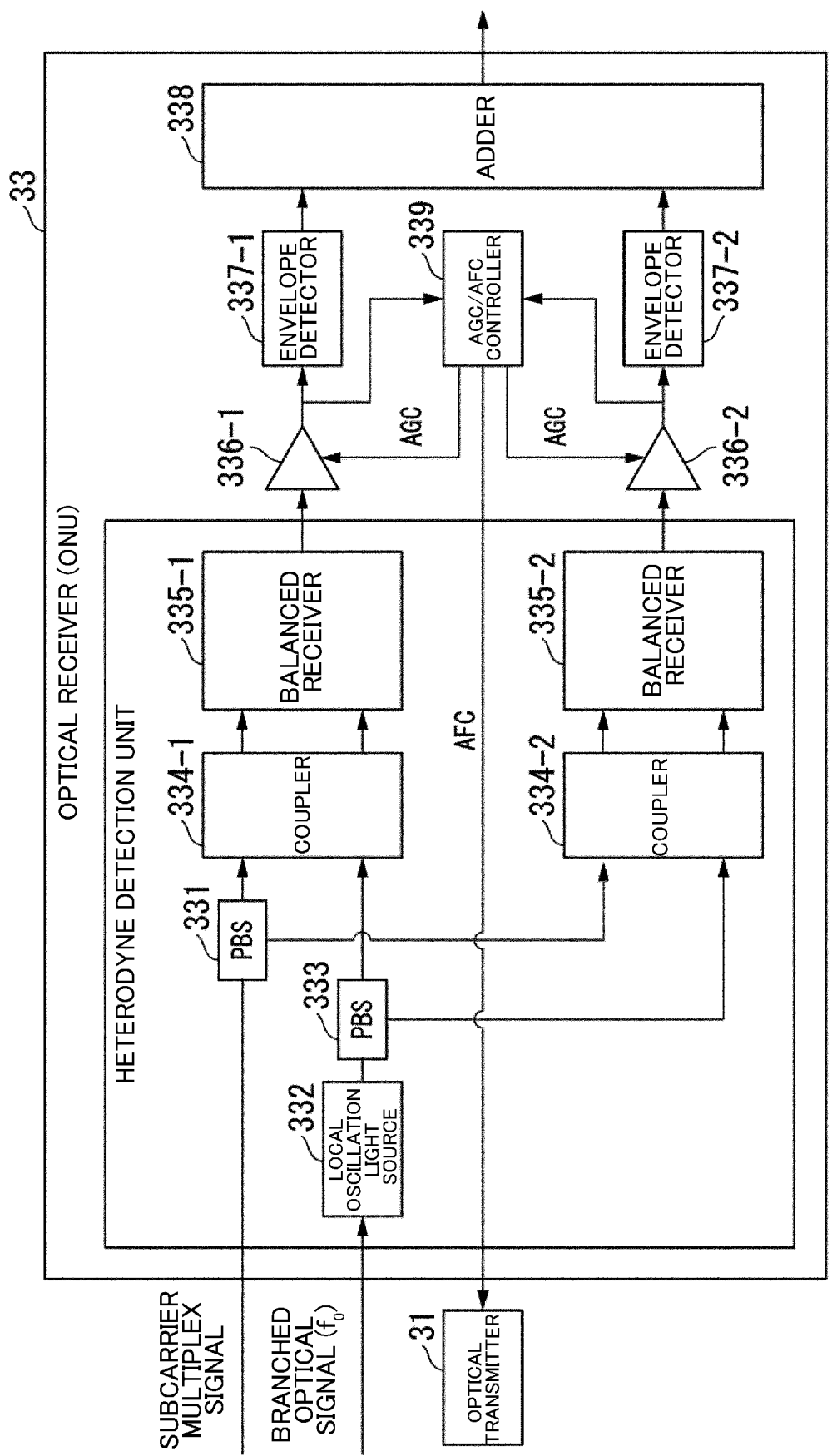
FIG. 3 is a block diagram showing a functional configuration of an optical receiver included in an ONU according to the first embodiment.

FIG. 3 is the block diagram showing the functional configuration of the optical receiver 33 provided in the ONU 3 according to the first embodiment. The optical receiver 33 is a digital coherent receiver for performing the optical heterodyne detection. The optical receiver 33 includes a PBS 331, a local oscillation light source 332, a PBS 333, couplers 334-1 and 334-2, balanced receivers 335-1 and 335-2, amplifiers 336-1 and 336-2, envelope detectors 337-1 and 337-2, an adder 338, and an AGC/AFC controller (controller) 339. The PBS 331, the local oscillation light source 332, the PBS 333, the couplers 334-1 and 334-2, the balanced receivers 335-1 and 335-2 are examples constituting the second heterodyne detection unit (heterodyne detector).

The PBS 331 is the polarization splitter. The PBS 331 inputs the optical signal (the downlink signal) transmitted from the ONU 3. The PBS 331 separates the inputted downlink signal into the downlink signal of the horizontal polarization and the downlink signal of the vertical polarization. The PBS 331 outputs the downlink signal of the horizontal polarization to the coupler 334-1, and outputs the downlink signal of the vertical polarization to the coupler 334-2.

The local oscillation light source 332 outputs the local light used for the optical heterodyne detection. For example, the local oscillation light source 332 outputs the optical signal of the laser 34, which is branched and inputted by the optical branching unit 35, as the local light.

The PBS 333 is the polarization splitter. The PBS 333 inputs the local light emitted from the local oscillation light source 332. The PBS 333 separates the inputted local light into the optical signal of the horizontal polarization and the optical signal of the vertical polarization. The PBS 333 outputs the optical signal of the horizontal polarization to the coupler 334-1, and outputs the optical signal of the vertical polarization to the coupler 334-2.

The coupler 334-1 multiplexes and interferes the downlink signal of the horizontal polarization outputted by the PBS 331 and the optical signal of the horizontal polarization outputted by the PBS 333 to generate the interference light. The coupler 334-1 branches the generated interference light into two interference lights and outputs the two interference lights to the balanced receiver 335-1.

The coupler 334-2 multiplexes and interferes the downlink signal of the vertical polarization outputted by the PBS 331 and the optical signal of the vertical polarization outputted by the PBS 333 to generate the interference light. The coupler 334-2 branches the generated interference light into two interference lights and outputs the two interference lights to the balanced receiver 335-2.

The balanced receiver 335-1 converts the two interference lights outputted from the coupler 334-1 into electric signals.

The balanced receiver 335-1 outputs the difference between the converted electric signals to the amplifier 336-1.

The balanced receiver 335-2 converts the two interference lights outputted from the coupler 334-2 into electric signals.

The balanced receiver 335-2 outputs the difference between the converted electric signals to the amplifier 336-2.

The amplifiers 336-1 and 336-2 amplify the inputted electric signal. In the amplifiers 336-1 and 336-2, the gain control is performed by the automatic gain control (AGC) from the AGC/AFC controller 339. The electric signal amplified by the amplifier 336-1 is input to the envelope detector 337-1 and the AGC/AFC controller 339. The electric signal amplified by the amplifier 336-2 is input to the envelope detector 337-2 and the AGC/AFC controller 339.

The envelope detector 337-1 detects the envelope of the electric signal outputted from the amplifier 336-1.

The envelope detector 337-2 detects the envelope of the electric signal outputted from the amplifier 336-2.

The adder 338 adds the envelopes outputted from the envelope detectors 337-1 and 337-2, respectively.

The AGC/AFC controller 339 controls the frequency of the laser 34 and the gain of the amplifiers 336-1 and 336-2 based on the electric signals outputted from the amplifiers 336-1 and 336-2. For example, the AGC/AFC controller 339 adjusts the frequency of the laser 34 by using a method for detecting the intermediate frequency from the electric signal at the time of the coherent detection. The technique described in the following reference 1 may be used for detecting the intermediate frequency from the electric signal at the time of the coherent detection.

(Reference document 1: "622 Mbit/s-16ch FDM coherent optical transmission apparatus", ITEJ technical report, vol. 17, 1993, No. 18, pp. 25-30)

The single carrier modulation signal can be demodulated by the analog electric circuit as shown in FIG. 3, and power consumption can be reduced as compared with the case of using digital signal processing. In order to control the uplink wavelength to the frequency deviated by the intermediate frequency ($f_{IF}=|f_1-f_0|$) of the optical heterodyne detection with respect to the downlink wavelength by the AGC/AFC controller 339, a part of the received electric signal is branched as shown in reference document 1. The branched electric signal is used for detecting the AGC of the electric amplifier and the deviation from the desired intermediate frequency ($f_{IF}$) for realizing polarization diversity reception by the maximum ratio combining method by frequency discrimination, and for performing the AFC for the uplink laser wavelength on the basis of the detected value.

When the OLT 2 uses the subcarrier multiplex signal as the downlink signal, the ONU 3 uses the configuration shown in FIG. 3 as the second heterodyne detection unit to demodulate the downlink signal by the digital signal processing. In this case, the deviation of the uplink wavelength can be calculated by the digital signal processing.

Figure 4:
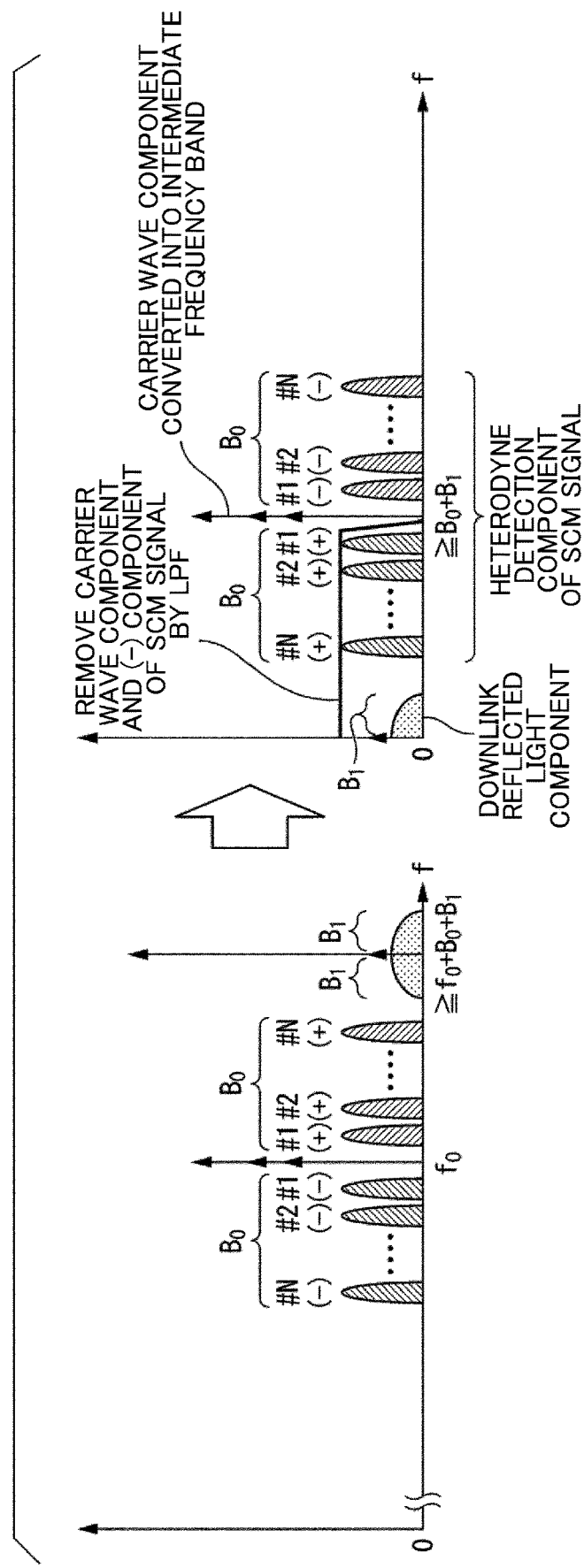
FIG. 4 is a diagram showing an example when a carrier wave of an optical transmitter according to the first embodiment is set at a frequency position equal to or more than $f_0+B_0+B_1$.
Figure 5:
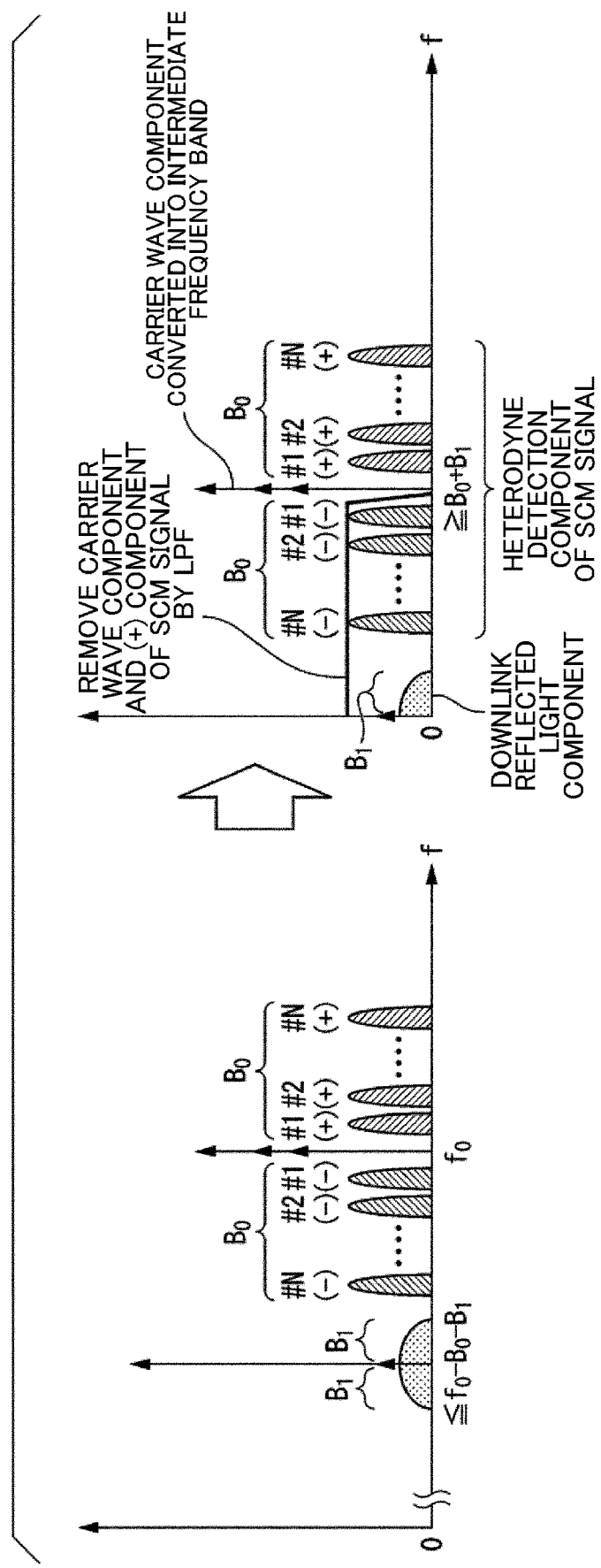
FIG. 5 is a diagram showing an example when a carrier wave of an optical transmitter according to the first embodiment is set at a frequency position equal to or less than $f_0-B_0-B_1$.

The modulation signal of the subcarrier generated by the optical transmitter 31 included in the ONU 3 shown in FIG. 1 is generated in the range of $\pm B_0$ with respect to the frequency $f_0$ of the carrier wave. FIG. 4 shows an example when the carrier wave is set at the frequency position of $f_0+B_0+B_1$ or more, and FIG. 5 shows an example when the carrier wave is set at the frequency position of $f_0-B_0-B_1$ or less. In FIGS. 4 and 5, the position is indicated by the frequency of the subcarrier multiplex signal received by the optical receiver in the left figure, and the specific processing of the optical receiver is described in the right figure.

In the right figure of FIG. 4, an example in which the optical heterodyne detection is performed, and only the upper side band component (+) of the subcarrier multiplex (SCM) signal is extracted by the LPF, or the lower side band component (−) is extracted by the HPF is shown. Thereafter, the optical receiver performs AD conversion on the signal and performs the digital signal processing for each subcarrier to demodulate the signal. As shown in FIG. 4, it is more economical to extract the upper side band component because it can be received by using the A/D converter 237 of the lower frequency. The carrier wave component converted into the intermediate frequency band is removed. When the upper side band component (+) is extracted by the LPF, the reflected light component of the downlink signal remains, but the frequency filtering is performed when the SCM signal is demodulated by the digital signal processing, so that there is no problem.

In the right figure of FIG. 5, an example in which the upper side band component (+) of the subcarrier multiplex signal converted into the signal of the intermediate frequency band by the optical heterodyne detection and the carrier wave component are removed by the LPF is shown.

Figure 6:
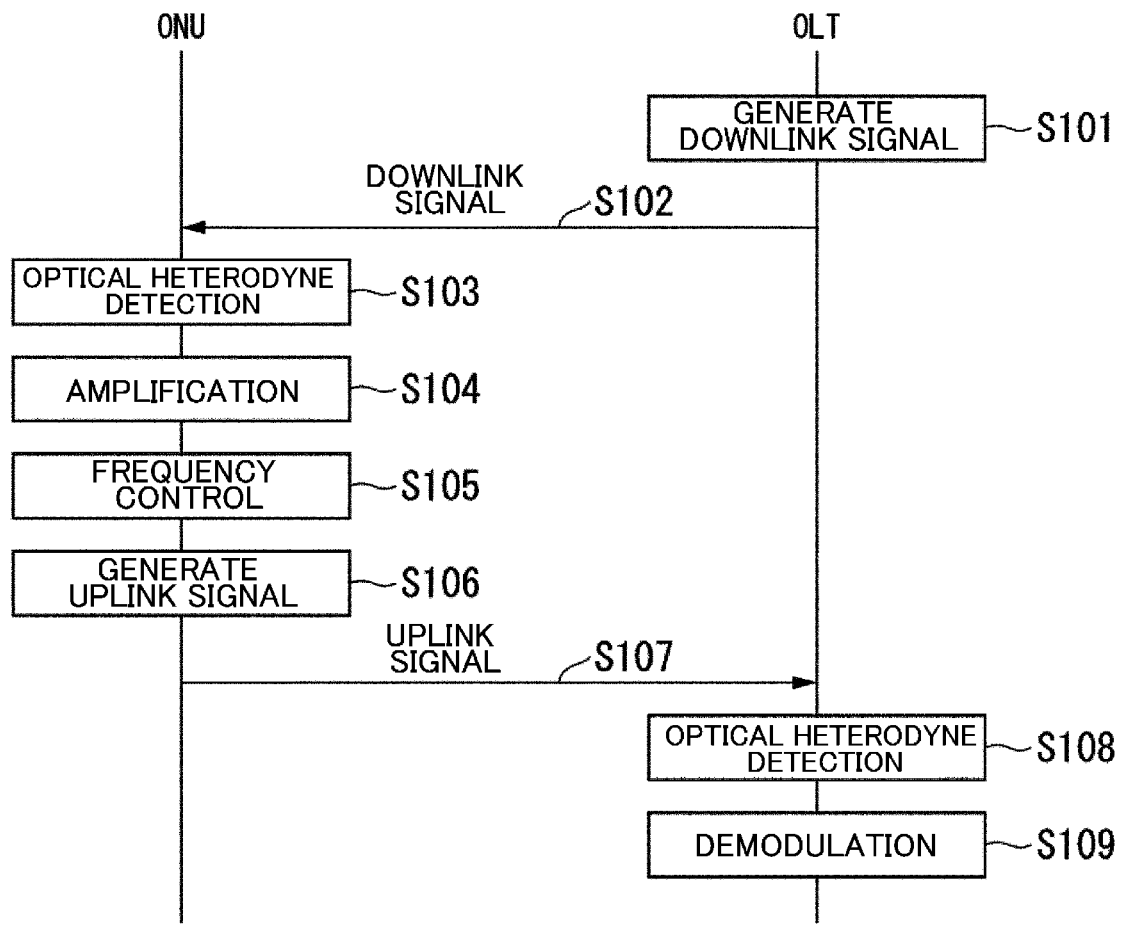
FIG. 6 is a sequence diagram showing a flow of processing of the transmission system according to the first embodiment.

FIG. 6 is the sequence diagram showing the flow of processing of the transmission system 1 according to the first embodiment. At the start of the processing shown in FIG. 6, it is assumed that the uplink signal of the ONU 3 is transmitted once. That is, it is assumed that the optical signal outputted from the laser 34 is inputted to the optical receiver 33.

The optical transmitter 21 of the OLT 2 generates the downlink signal (step S101). The optical transmitter 21 transmits the generated downlink signal to the optical circulator 22. The downlink signal inputted to the optical circulator 22 is sent to the optical fiber 4 (step S102).

The down signal inputted to the optical circulator 32 of the ONU 3 via the optical fiber 4 is outputted to the optical receiver 33. The optical receiver 33 receives the downlink signal outputted from the optical circulator 32. The optical receiver 33 acquires the electric signal of the horizontal polarization and the electric signal of the vertical polarization by performing the optical heterodyne detection of the received downlink signal (step S103). In this case, the optical receiver 33 uses the optical signal outputted from the laser 34 as the local light to be used for the optical heterodyne detection. The electric signal of the horizontal polarization is inputted to the amplifier 336-1, and the electric signal of the vertical polarization is inputted to the amplifier 336-2. The amplifier 336-1 amplifies the electric signal of the horizontal polarization. The amplifier 336-2 amplifies the electric signal of the vertical polarization (step S104).

The amplifier 336-1 outputs the amplified electric signal of the horizontal polarization to the envelope detector 337-1 and the AGC/AFC controller 339. The amplifier 336-2 outputs the amplified electric signal of the vertical polarization to the envelope detector 337-2 and the AGC/AFC controller 339.

The AGC/AFC controller 339 controls the frequency of the laser 34 and the gains of the amplifiers 336-1 and 336-2 based on the electric signals outputted from the amplifiers 336-1 and 336-2 (step S105). Here, the configuration for controlling the frequency of the laser 34 will be described in detail.

The AGC/AFC controller 339 detects the deviation from the desired intermediate frequency ($f_{IF}$) on the basis of the electric signals outputted from the amplifiers 336-1 and 336-2 by the frequency discrimination. The AGC/AFC controller 339 controls the frequency of the laser 34 in accordance with the deviation from the detected intermediate frequency ($f_{IF}$).

Thereafter, the optical transmitter 31 of the ONU 3 generates the uplink signal by using the adjusted laser 34 (step S106). The optical transmitter 31 transmits the generated uplink signal to the optical circulator 32. The uplink signal inputted to the optical circulator 32 is sent to the optical fiber 4 (step S107).

The uplink signal inputted to the optical circulator 22 of the OLT 2 via the optical fiber 4 is outputted to the optical receiver 23. The optical receiver 23 receives the uplink signal outputted from the optical circulator 22. The optical receiver 23 acquires the electric signal of the horizontal polarization and the electric signal of the vertical polarization by performing the optical heterodyne detection of the received uplink signal (step S108). In this case, the optical receiver 23 uses the optical signal outputted from the laser 24 as the local light to be used for the optical heterodyne detection. The acquired electric signal of the horizontal polarization and the electric signal of the vertical polarization are demodulated by the filter 236, the A/D converter and the digital signal processing unit 238 at a post-stage (step S109).

According to the optical transmission system 1 of the first embodiment configured as described above, the uplink signal wavelength transmitted from each ONU 3 is controlled to a value deviated from the downlink signal wavelength by the intermediate frequency of the optical heterodyne detection. Thus, it is possible to prevent overlapping of each optical subcarrier of the multiplexed optical carrier multiplex signal on the frequency axis. Further, the cost of the transmitter-receiver can be reduced by using the optical heterodyne detector instead of the optical intradyne detector for receiving the uplink signal and the downlink signal.

Therefore, it is possible to suppress overlapping of the optical subcarrier of the multiplex signal on the frequency axis at low cost.

In this embodiment, the local oscillation light sources 232 and the local oscillation light sources 332 use the optical signal outputted from the laser as the local light. Thus, the number of light sources can be reduced (for example, half the number of light sources) compared to the case where different light sources for the optical signal and the local light are prepared. Accordingly, the cost of the device can be reduced.

Second Embodiment

In the first embodiment, the case where the DSB optical transmitter is used as the optical transmitter of the ONU 3 has been described. In the second embodiment, the case where an SSB optical transmitter is used as the optical transmitter of the ONU 3 will be described.

Figure 7:
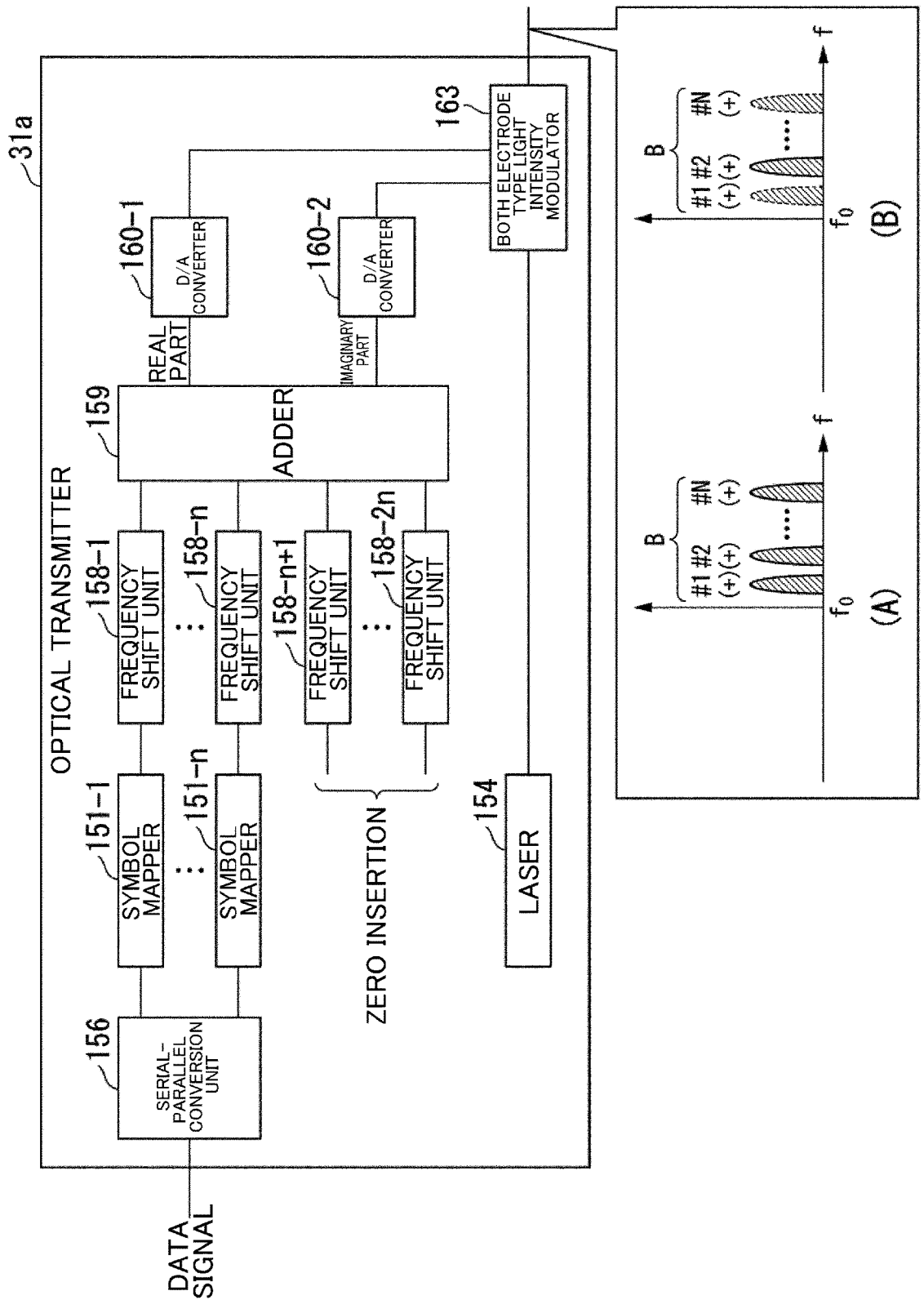
FIG. 7 is a block diagram showing a functional configuration of an optical transmitter according to a second embodiment.

FIG. 7 is the block diagram showing the functional configuration of an optical transmitter 31*a* according to the second embodiment. The optical transmitter 31*a* includes symbol mappers 151-1 to 151-*n*, a laser 154, a serial-parallel conversion unit 156, frequency shift units 158-1 to 158-2*n*, an adder 159, D/A converters 160-1 and 160-2, and a both-electrode type light intensity modulator 163. The following only describes differences from the optical transmitter 31 according to the first embodiment.

The frequency shift units 158-1 to 158-*n* moves the data signal mapped by the symbol mappers 151-1 to 151-*n* so as not to overlap on the frequency axis. A zero value is inputted to the frequency shift units 158-*n*+1 to 158-2*n*. In this case, the output from the frequency shift units 158-*n*+1 to 158-2*n* is zero.

The adder 159 generates the frequency multiplex signal by adding data signals outputted from the frequency shift units 158-1 to 158-2*n*, respectively. In the example shown in FIG. 8, the adder 159 generates the frequency multiplex signal by adding the data signals outputted from the frequency shift units 158-1 to 158-*n*, respectively.

The D/A converters 160-1 to 160-2 perform digital-to-analog conversion of the frequency multiplex signal. For example, the D/A converter 160-1 performs the digital-to-analog conversion of a real part (I component) of the frequency multiplex signal. For example, the D/A converter 160-2 performs the digital-to-analog conversion of an imaginary part (Q component) of the frequency multiplex signal. Thus, a subcarrier multiplex signal divided into I and Q components is generated in the electric stage.

The both-electrode type light intensity modulator 163 generates the modulation signal by optically modulating the intensity of the output light of the laser 154 with the subcarrier multiplex signal divided into I and Q components. The subcarrier multiplex signal of either one of the I component and the Q component is inputted to the both-electrode type light intensity modulator 163. Therefore, the both-electrode type light intensity modulator 163 generates the modulation signal of any of the components of the upper side band (+) and the lower side band (−). The both-electrode type light intensity modulator 163 transmits the generated modulation signal via the optical fiber to the ONU 3.

Figure 8:
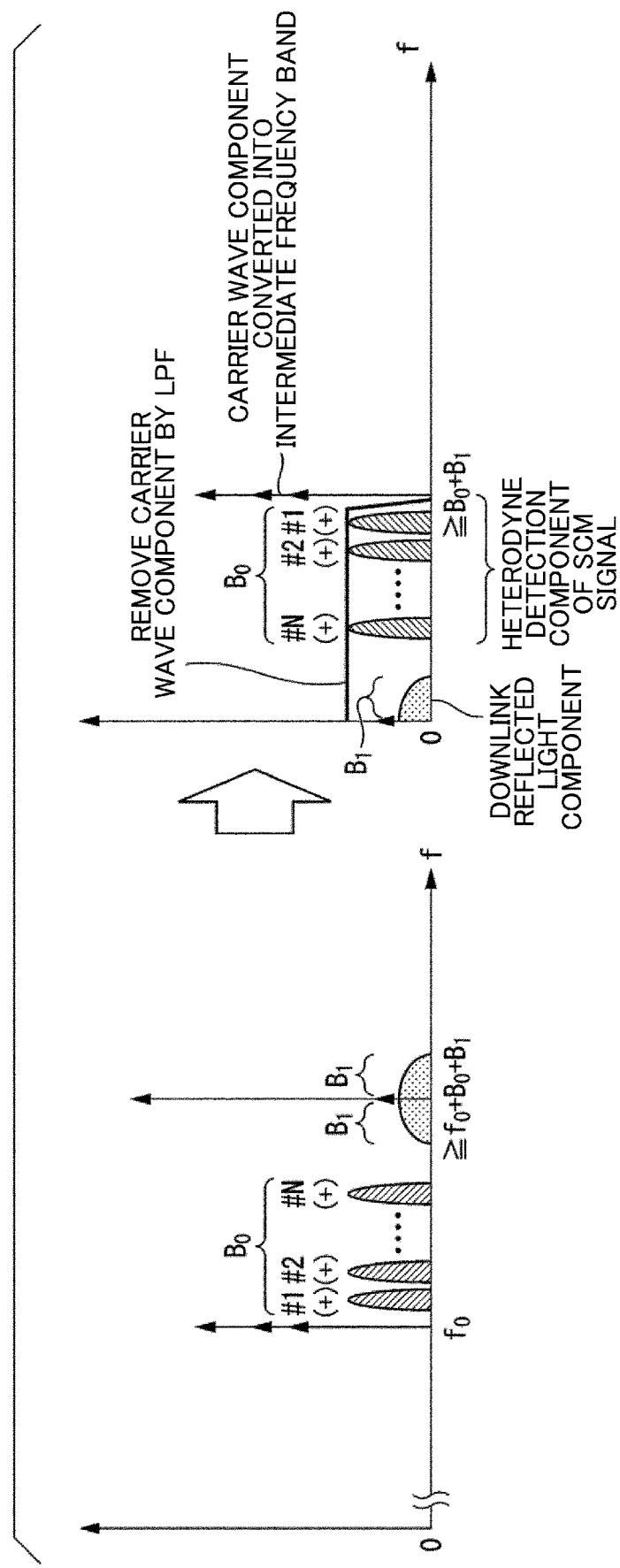
FIG. 8 is a diagram showing an example when a carrier wave of an optical transmitter according to the first embodiment is set at a frequency position equal to or more than $f_0+B_0+B_2$.
Figure 9:
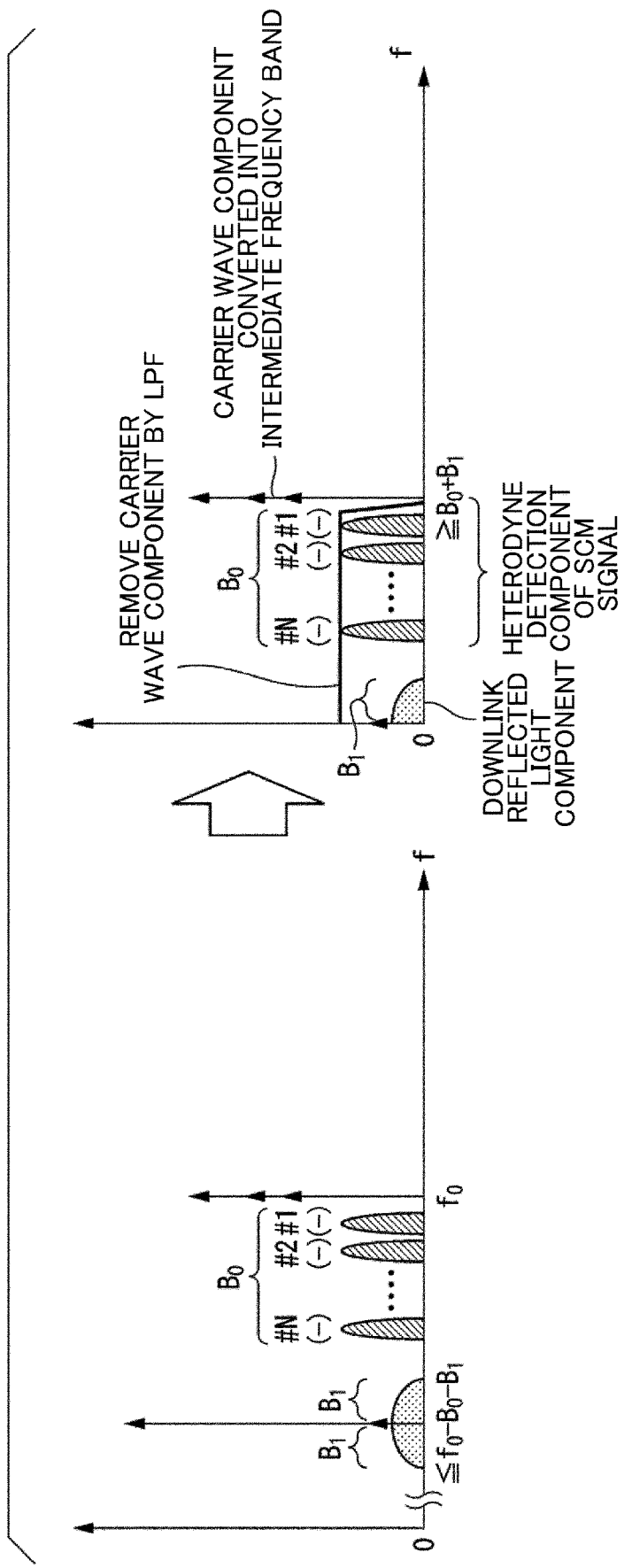
FIG. 9 is a diagram showing an example when a carrier wave of an optical transmitter according to the first embodiment is set at a frequency position equal to or less than $f_0-B_0-B_2$.
Figure 10:
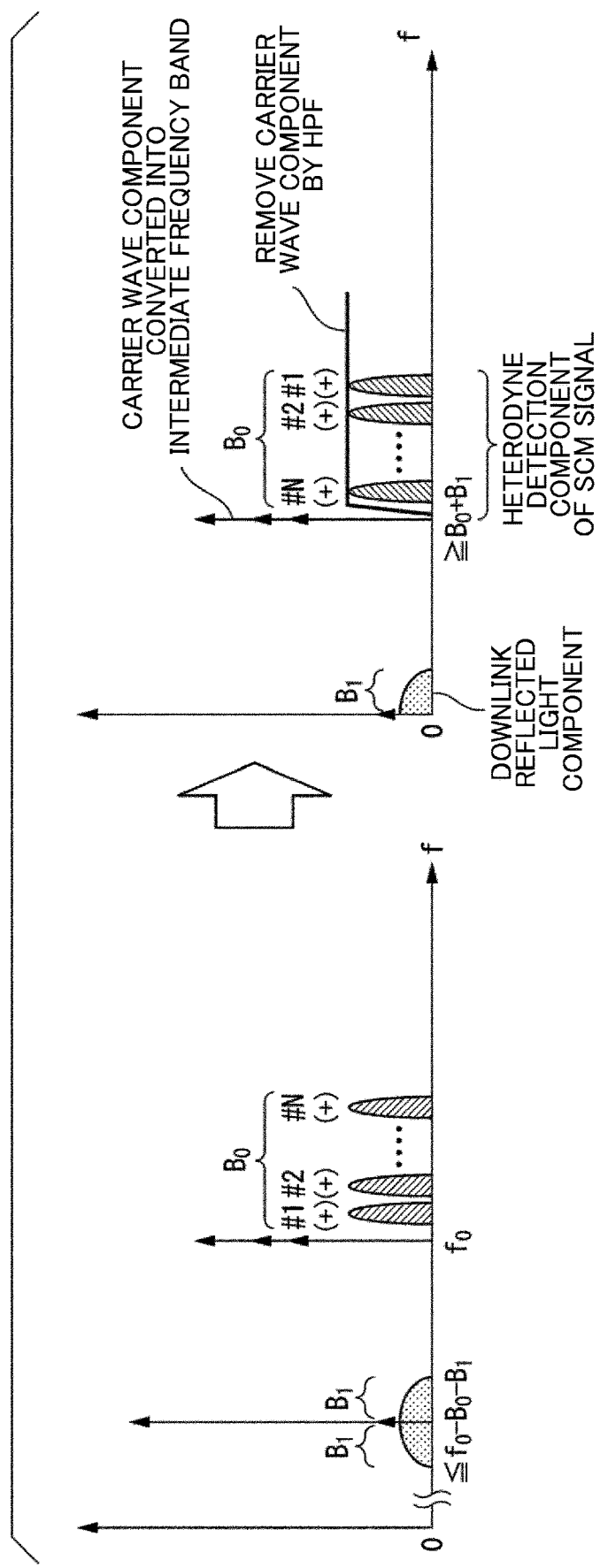
FIG. 10 is a diagram showing an example when a carrier wave of an optical transmitter according to the first embodiment is set at a frequency position equal to or less than $f_0-B_0-B_2$.
Figure 11:
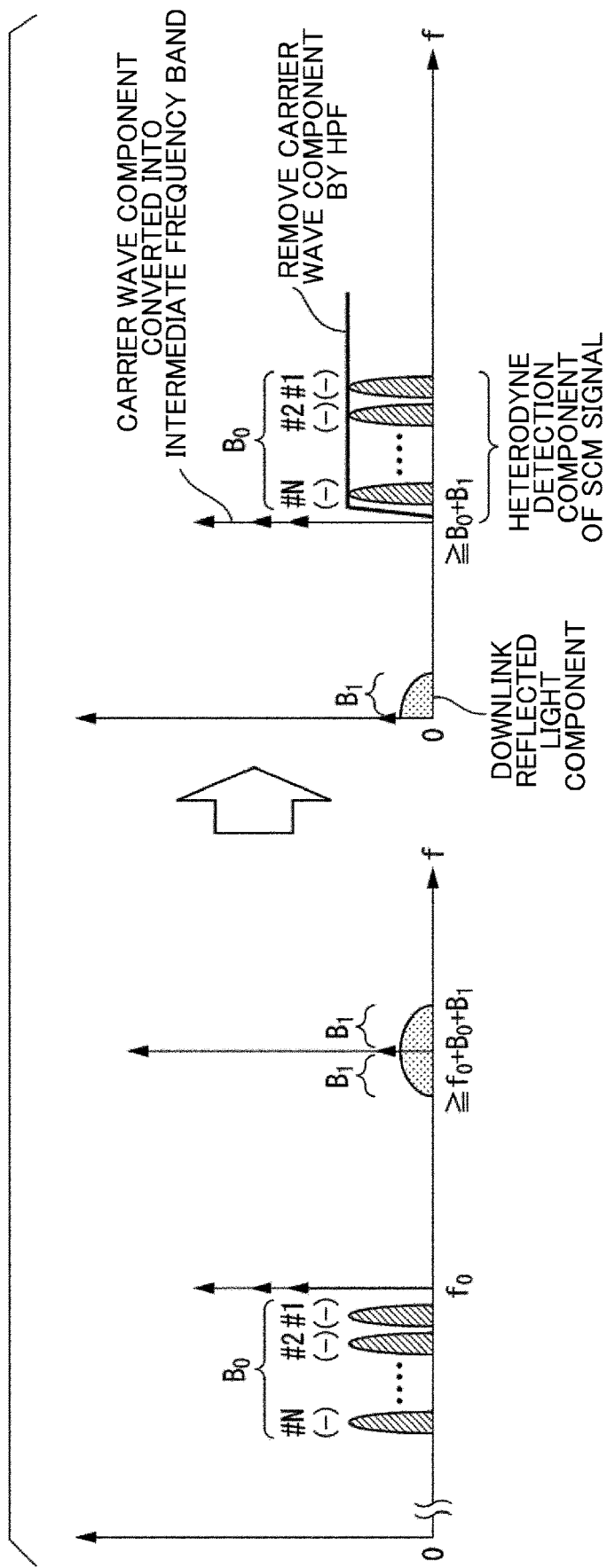
FIG. 11 is a diagram showing an example when a carrier wave of an optical transmitter according to the first embodiment is set at a frequency position equal to or more than $f_0+B_0+B_2$.

The modulation signal of the subcarrier generated by the optical transmitter 31*a* shown in FIG. 7 is generated in the range of ±$B_0$ to the carrier wave frequency $f_0$. FIG. 8 shows an example when the carrier wave is set at the frequency position of $f_0+B_0+B_1$ or more, and FIG. 9 shows an example when the carrier wave is set at the frequency position of $f_0-B_0-B_1$ or less. FIG. 10 shows the example when the carrier wave is set at the frequency position of $f_0-B_0-B_1$ or less, and FIG. 11 shows the example when the carrier wave is set at the frequency position of $f_0+B_0+B_1$ or more.

In FIGS. 8 to 11, the position is indicated by the frequency of the subcarrier multiplex signal received by the optical receiver in the left figure, and the specific processing of the optical receiver is described in the right figure.

The right figure of FIG. 8 shows the example in which the optical heterodyne detection is performed and only the upper side band component (+) of the subcarrier multiplex signal is extracted by the LPF. Thereafter, the optical receiver performs AD conversion of the signal and performs the digital signal processing for each subcarrier to demodulate the signal. The carrier wave component converted into the intermediate frequency band is removed.

The right figure of FIG. 9 shows the example in which the optical heterodyne detection is performed, only the lower side band component (−) of the subcarrier multiplex signal is extracted by the LPF, and the carrier wave component is removed by the LPF.

The right figure of FIG. 10 shows the example in which the optical heterodyne detection is performed, only the upper side band component (+) of the subcarrier multiplex signal is extracted by the HPF, and the carrier wave component is removed.

The right figure of FIG. 11 shows the example in which the optical heterodyne detection is performed, only the lower side band component (−) of the subcarrier multiplex signal is extracted by HPF, and the carrier wave component is removed.

According to the optical transmission system 1 of the second embodiment configured as above-described, it is possible to receive the signal using the cheaper heterodyne detector. Therefore, even when the uplink signal is SSB, it is possible to suppress overlapping of the optical subcarrier of the multiplex signal on the frequency axis at low cost.

Modification Example

Although FIG. 7 shows an example in which the optical transmitter 31*a* generates the modulation signal including only the component of the upper side band (+), the optical transmitter 31*a* may be configured to generate the modulation signal including only the component of the lower side band (−). In such the configuration, a value of zero is inputted to the frequency shift units 158-1 to 158-*n*, and the data signal mapped by the symbol mappers 151-1 to 151-*n* is inputted to the frequency shift units 158-*n*+1 to 158-2*n*. The frequency shift units 158-*n*+1 to 158-2*n* moves the data signal mapped by the symbol mappers 151-1 to 151-*n* so as not to overlap on the frequency axis.

Third Embodiment

In the first embodiment, in order to avoid the influence of the reflected light, it is necessary to set the intermediate frequency in the optical heterodyne detection to a large value, and there is a problem that the band of the electric components to be used is increased. Therefore, in the third embodiment, the configuration in which the OLT uses an SSB signal (or a VSB (Vestigial Sideband Modulation) signal) as the downlink signal will be described.

Figure 12:
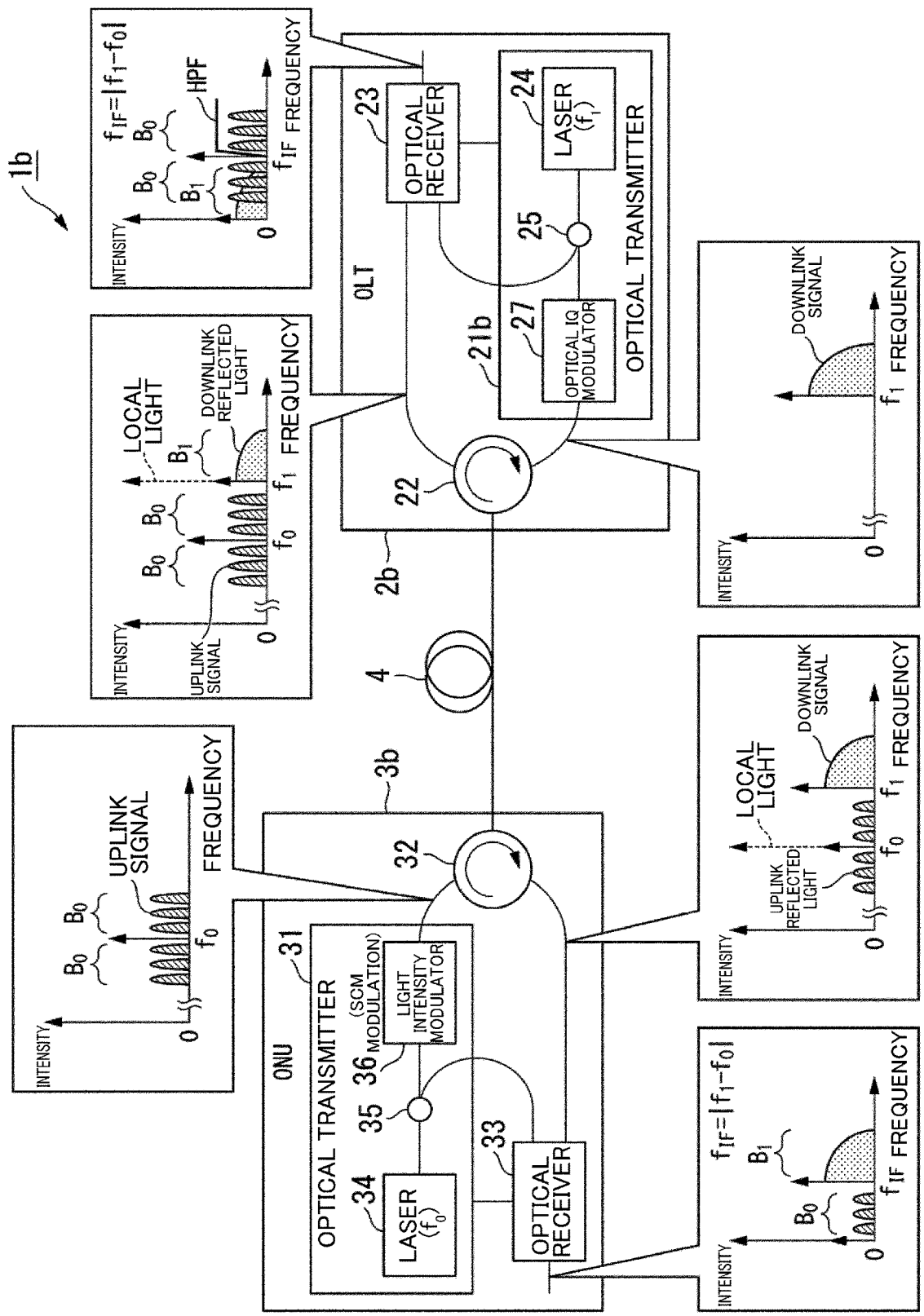
FIG. 12 is a diagram showing a configuration of an optical transmission system according to a third embodiment.
Figure 13:
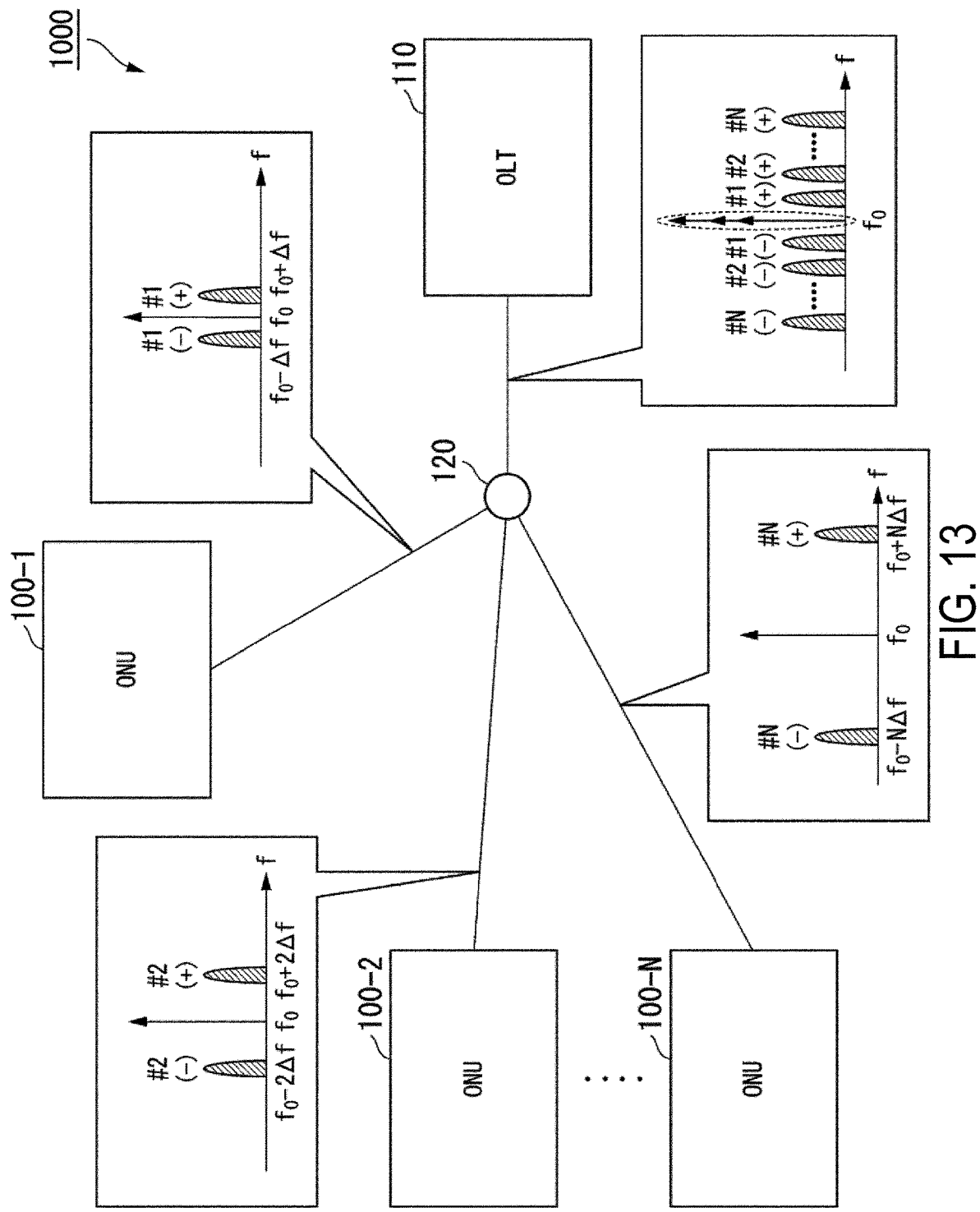
FIG. 13 is a diagram showing a configuration of an optical transmission system according to a conventional technique.

FIG. 12 is a diagram showing a configuration of an optical transmission system 1*b* according to the third embodiment. FIG. 12 shows a case where the optical transmission system 1b is applied to the PON system. The optical transmission system 1b includes an OLT 2b, and an ONU 3b. The OLT 2b and the ONU 3b are connected to each other via the optical fiber 4. Although the number of ONUs 3b is one in FIG. 12, a plurality of ONUs 3b may be provided in the optical transmission system 1b.

The difference from the first embodiment is that the OLT 2b uses the SSB signal (or the VSB signal) as the downlink signal.

The OLT 2b includes an optical transmitter 21b, an optical circulator 22, and an optical receiver 23.

The optical transmitter 21b generates the downlink signal and transmits the generated downlink signal to the ONU 3b. When the subcarrier multiplex signal is used in the optical transmitter 21b, the specific configuration of the optical transmitter 21b is as shown in FIGS. 7 and 16. The setting of the intermediate frequency satisfies $B_0+B_1>|f_1-f_0|(=f_{IF})>B_1$. By using the SSB signal as the downlink signal, the value of the intermediate frequency $f_{IF}$ can be set lower than those of the above embodiments. In FIG. 12, the case where the SSB signal is generated by using the optical IQ modulator as the downlink signal will be described as an example.

The optical transmitter 21b includes the laser 24, the optical branching unit 25, and the optical IQ modulator 27. In FIG. 12, the omitted optical transmitter 21b is provided with respective configurations shown in FIGS. 7 and 16 before the optical IQ modulator 27.

The optical IQ modulator 27 generates the modulation signal by optically modulating the output light of the laser 24 with a subcarrier multiplex signal divided into the I component and the Q component. Here, as a method for generating the SSB signal and the VSB signal by single carrier modulation in the optical transmitter 21b, the following technique of the reference document 2 (SSB signal) and the reference document 3 (VSB signal) may be used.

(Reference document 2: "SPM effect on carrier-suppressed optical SSB transmission with NRZ and RZ formats", IET Electron. Lett., Vol. 14, No. 18, pp. 1150-1151, 2004)

(Reference document 3: "Dispersion compensation for homodyne detection systems using a 10-Gb/s optical PSK-VSB signal", IEEE Photon. Technol. Lett., Vol. 7, No 8, pp. 929-931, 1995)

In the transmission of the uplink subcarrier multiplex signal transmitted by the ONU 3b, when the uplink signal is SSB modulation, the side band at a frequency position far from the downlink signal is generated.

The OLT 2b extracts a desired side band by the HPF at the time of receiving the uplink subcarrier multiplex signal. In the case where the uplink signal is the DSB modulation, the reflection component of the downlink signal and the side band component at the frequency position close to the local light overlap on the frequency axis, but the present side band component is not used, so that no problem occurs.

According to the optical transmission system 1b of the third embodiment that has the above-described configurations, it is possible to achieve the same effects as those of the first embodiment.

Furthermore, according to the optical transmission system 1b, since the OLT 2b uses the SSB signal or the VSB signal as the downlink signal, the band of the electric component to be used can be suppressed.

In the third embodiment, the OLT 2b cuts out only the side band farther from the local light out of the side band of the received signal by the filter when receiving, so that the intermediate frequency between $f_0$ and $f_1$ can be made smaller than that in the first and second embodiments. Therefore, the band required for the optical receiver can be reduced, and cost reduction can be expected.

Although the embodiments of the present invention have been described in detail with reference to the drawings, specific configurations are not limited to these embodiments, and designs and the like within a range that does not deviate from the gist of the present invention are also included.

INDUSTRIAL APPLICABILITY

The present invention can be applied to an optical access system performing subcarrier multiplex.

REFERENCE SIGNS LIST

2 OLT
3 ONU
4 Optical fiber
21, 31 Optical transmitter
22, 32 Optical circulator
23, 33 Optical receiver
24, 34 Laser
25, 35 Optical branching unit
26, 36 Light intensity modulator
231, 233, 331, 333> PBS
232, 332 Local oscillation light source
234-1, 234-2, 334-1, 334-2 Coupler
235-1, 235-2, 335-1, 335-2 Balanced receiver
236-1, 236-2 Filter
237-1, 237-2 A/D converter
238 Digital signal processing unit
336-1, 336-2 Amplifier
337-1, 337-2 Envelope detector
338 Adder
339 AGC/AFC controller

The invention claimed is:

1. An optical transmission apparatus comprising:
an optical transmitter configured to generate an optical signal in an uplink direction by modulating output light of a laser that outputs light of a first frequency with a subcarrier on which transmission data is superimposed;
a heterodyne detector configured to receive an optical signal in a downlink direction by heterodyne detection, wherein the optical signal in a downlink direction being an optical signal of a same frequency transmitted from an opposing apparatus to a plurality of optical transmission apparatuses; and
a controller configured to calculate a first intermediate frequency based on a frequency of a downlink signal received by the heterodyne detection and the first frequency of the laser, and controls the first frequency of the laser when there is a difference between the calculated first intermediate frequency and a reference second intermediate frequency by a threshold or more, wherein
the heterodyne detector receives, by the heterodyne detection, an optical signal in the downlink direction transmitted from an optical transmitter that generates the optical signal in the downlink direction by performing single side band modulation or vestigial sideband modulation of output light of a laser that outputs light of a second frequency different from the first frequency with the subcarrier on which transmission data is superimposed,
wherein the optical signal in an uplink direction is a double sideband modulated signal, wherein the first intermediate frequency is a value satisfying a condition indicated in the following Equation (1), where $B_0$ being a bandwidth of one sideband of the optical signal in the uplink direction, $B_1$ being a bandwidth of one sideband of the optical signal in the downlink direction, and $f_{IF}$ being the first intermediate frequency $$B_0 + B_1 > f_{IF} > B_1 \qquad \text{Equation (1).}$$

2. The optical transmission apparatus according to claim 1, wherein
the controller controls the first frequency of the laser so that the first intermediate frequency and the second intermediate frequency becomes the same value when a deviation equal to or more than the threshold occurs.

3. The optical transmission apparatus according to claim 1, further comprising
a brancher configured to branch the output light of the laser and input the branched light to the heterodyne detector, wherein
the heterodyne detector uses the branched output light of the laser as local light to be used for the heterodyne detection, and
the controller calculates a difference between the frequency of the branched output light of the laser and the frequency of the downlink signal received by the heterodyne detection as the first intermediate frequency.

4. The optical transmission apparatus according to claim 1, wherein
the first intermediate frequency is equal to or more than a value obtained by adding a bandwidth of one side band of the uplink signal subjected to both side band modulation and a bandwidth of one side band of the downlink signal.

5. A frequency control method in optical transmission comprising:
generating an optical signal in an uplink direction by modulating output light of a laser that outputs the light of a first frequency with a subcarrier on which transmission data is superimposed;
receiving an optical signal in a downlink direction by heterodyne detection, wherein the optical signal in a downlink direction being an optical signal of a same frequency transmitted from an opposing apparatus to a plurality of optical transmission apparatuses; and
calculating a first intermediate frequency based on a frequency of a downlink signal received by the heterodyne detection and the first frequency of the laser and controlling the first frequency of the laser when there is a difference between the calculated first intermediate frequency and a reference second intermediate frequency by a threshold or more, wherein
receiving, by the heterodyne detection, an optical signal in the downlink direction transmitted from an optical transmitter that generates the downlink optical signal by performing single side band modulation or vestigial sideband modulation of output light of a laser that outputs light of a second frequency different from the first frequency with the subcarrier on which transmission data is superimposed,
wherein the optical signal in an uplink direction is a double sideband modulated signal,
wherein the first intermediate frequency is a value satisfying a condition indicated in the following Equation (1), where $B_0$ being a bandwidth of one sideband of the optical signal in the uplink direction, $B_1$ being a bandwidth of one sideband of the optical signal in the downlink direction, and $f_{IF}$ being the first intermediate frequency $$B_0 + B_1 > f_{IF} > B_1 \qquad \text{Equation (1).}$$

6. An optical transmission system comprise a plurality of first optical transmission apparatuses and a second optical transmission apparatus that communicates with each of the plurality of first optical transmission apparatuses,
wherein the second optical transmission apparatus include a transmitter configured to transmit an optical signal in a downlink direction which is an optical signal of a same frequency to the plurality of first optical transmission apparatuses,
wherein the plurality of first optical transmission apparatuses include an optical transmitter configured to generate an optical signal in an uplink direction by modulating output light of a laser that outputs light of a first frequency with a subcarrier on which transmission data is superimposed;
a heterodyne detector configured to receive the optical signal in the downlink direction by heterodyne detection; and
a controller configured to calculate a first intermediate frequency based on a frequency of a downlink signal received by the heterodyne detection and the first frequency of the laser, and controls the first frequency of the laser when there is a difference between the calculated first intermediate frequency and a reference second intermediate frequency by a threshold or more, wherein
the heterodyne detector receives, by the heterodyne detection, an optical signal in the downlink direction transmitted from an optical transmitter that generates the downlink optical signal by performing single side band modulation or vestigial sideband modulation of output light of the laser that outputs light of a second frequency different from the first frequency with the subcarrier on which transmission data is superimposed,
wherein the optical signal in an uplink direction is a double sideband modulated signal,
wherein the first intermediate frequency is a value satisfying a condition indicated in the following Equation (1), where $B_0$ being a bandwidth of one sideband of the optical signal in the uplink direction, $B_1$ being a bandwidth of one sideband of the optical signal in the downlink direction, and $f_{IF}$ being the first intermediate frequency $$B_0 + B_1 > f_{IF} > B_1 \qquad \text{Equation (1).}$$

* * * * *